United States Patent
Lee et al.

(10) Patent No.: US 10,627,607 B2
(45) Date of Patent: Apr. 21, 2020

(54) OPTICAL LENS ASSEMBLY AND ELECTRONIC APPARATUS INCLUDING THE SAME

(71) Applicant: Samsung Electronics Co., Ltd., Gyeonggi-do (KR)

(72) Inventors: Hwan-seon Lee, Gyeonggi-do (KR); Chang-han Kim, Gyeonggi-do (KR); Young-woo Park, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 129 days.

(21) Appl. No.: 15/889,487

(22) Filed: Feb. 6, 2018

(65) Prior Publication Data

US 2018/0239117 A1    Aug. 23, 2018

(30) Foreign Application Priority Data

Feb. 17, 2017  (KR) .................. 10-2017-0021554

(51) Int. Cl.
*G02B 9/08* (2006.01)
*G02B 13/06* (2006.01)
*G02B 27/00* (2006.01)
*G02B 9/64* (2006.01)
*G02B 13/00* (2006.01)

(52) U.S. Cl.
CPC ............... *G02B 13/06* (2013.01); *G02B 9/64* (2013.01); *G02B 13/0045* (2013.01); *G02B 27/0025* (2013.01)

(58) Field of Classification Search
CPC ............... G02B 13/06; G02B 13/0045; G02B 27/0025; G02B 9/64; G02B 9/08; G02B 15/1421; G02B 13/003
See application file for complete search history.

(56) References Cited

U.S. PATENT DOCUMENTS

| | | | |
|---|---|---|---|
| 7,675,694 B2 | 3/2010 | Kim et al. | |
| 8,385,008 B2 | 2/2013 | Hsieh et al. | |
| 8,792,185 B2 | 7/2014 | Hsu et al. | |
| 2013/0208178 A1* | 8/2013 | Park | G02B 9/60 |
| 2015/0207998 A1 | 7/2015 | Lin et al. | |

* cited by examiner

*Primary Examiner* — Joseph P Martinez
(74) *Attorney, Agent, or Firm* — Cha & Reiter, LLC.

(57) ABSTRACT

Provided are an optical lens assembly and an electronic apparatus including the same. The optical lens assembly implements a wide-angle lens system by including a first lens group having positive refractive power, an iris diaphragm, and a second lens group having positive refractive power, where the first lens group, the iris diaphragm, and the second lens group are arranged from an object side to an image side, and the first lens group includes at least one negative lens and two positive lenses.

13 Claims, 16 Drawing Sheets

OPTICAL LENS ASSEMBLY AND ELECTRONIC APPARATUS INCLUDING THE SAME

CROSS-REFERENCE TO RELATED APPLICATION

This application is based on and claims priority under 35 U.S.C. § 119 to Korean Patent Application No. 10-2017-0021554, filed on Feb. 17, 2017, in the Korean Intellectual Property Office, the disclosure of which is incorporated by reference herein in its entirety.

BACKGROUND

1. Field

The present disclosure generally relates to optical lens assemblies and electronic apparatuses including the same, and more particularly, to wide-angle optical lens assemblies and electronic apparatuses including the same.

2. Description of the Related Art

As technologies have progressed, services and functions provided by electronic apparatuses have gradually expanded. Electronic apparatuses such as mobile devices or user devices may provide various services through various sensor modules. These electronic apparatuses may provide multimedia services such as photo or video capture. As the use of electronic apparatuses has increased, the use of cameras functionally connected to the electronic apparatuses has also gradually increased. For example, performances and/or resolutions of cameras of electronic apparatuses have improved according to user demand. Cameras of electronic apparatuses may be used to take various types of pictures such as landscape pictures, portraits, or selfies. Multimedia files such as pictures or moving images may be shared on social network sites or other media.

With the development of semiconductor and display technologies, performance of camera lenses in mobile devices have steadily improved, such as from low resolution to high resolution, from small sensor format to larger sensor format (e.g., ⅛" to ½" sensors), and from telephoto lenses to wide-angle lenses.

SUMMARY

As the use of imaging devices in portable apparatuses has increased, there is an increasing demand for miniaturization of such imaging devices. However, in the case of a wide-angle lens system, it is difficult to perform aberration control while also miniaturizing the lens system. Also, since wide-angle lens systems are sensitive to temperature changes, minimizing performance degradation due to temperature changes is also required.

In accordance with an aspect of the present disclosure, provided are wide-angle optical lens assemblies for use in electronic apparatuses (e.g., portable terminals).

In accordance with another aspect of the present disclosure, provided are electronic apparatuses including wide-angle optical lens assemblies.

Additional aspects will be set forth in part in the description which follows and, in part, will be apparent from the description, or may be learned by practice of the presented embodiments.

According to an aspect of an embodiment, an optical lens assembly includes a first lens group having positive refractive power, an iris diaphragm, and a second lens group having positive refractive power, where the first lens group, the iris diaphragm, and the second lens group are arranged from an object side to an image side, the first lens group includes at least one negative lens and two positive lenses, and the optical lens assembly satisfies the following condition:

$$1.5 < \frac{fb}{fa} < 25$$

where "fa" denotes a focal length of the first lens group and "fb" denotes a focal length of the second lens group.

According to an aspect of another embodiment, an optical lens assembly includes: a first lens having negative refractive power; a second lens having negative refractive power; a third lens having positive refractive power; a fourth lens having a convex object-side surface and positive refractive power; a fifth lens having positive refractive power; a sixth lens having a concave object-side surface and negative refractive power; a seventh lens having positive refractive power; and an eighth lens having an image-side surface that is concave toward an image side in a paraxial region, where the first to eighth lenses are sequentially arranged from an object side to the image side.

According to an aspect of another embodiment, an electronic apparatus includes: an optical lens assembly; and an image sensor configured to receive light formed by the optical lens assembly, where the optical lens assembly includes a first lens group having positive refractive power, an iris diaphragm, and a second lens group having positive refractive power, the first lens group, the iris diaphragm, and the second lens group are arranged from an object side to an image side, the first lens group includes at least one negative lens and two positive lenses, and the optical lens assembly satisfies the following condition:

$$1.5 < \frac{fb}{fa} < 25$$

where "fa" denotes a focal length of the first lens group and "fb" denotes a focal length of the second lens group.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
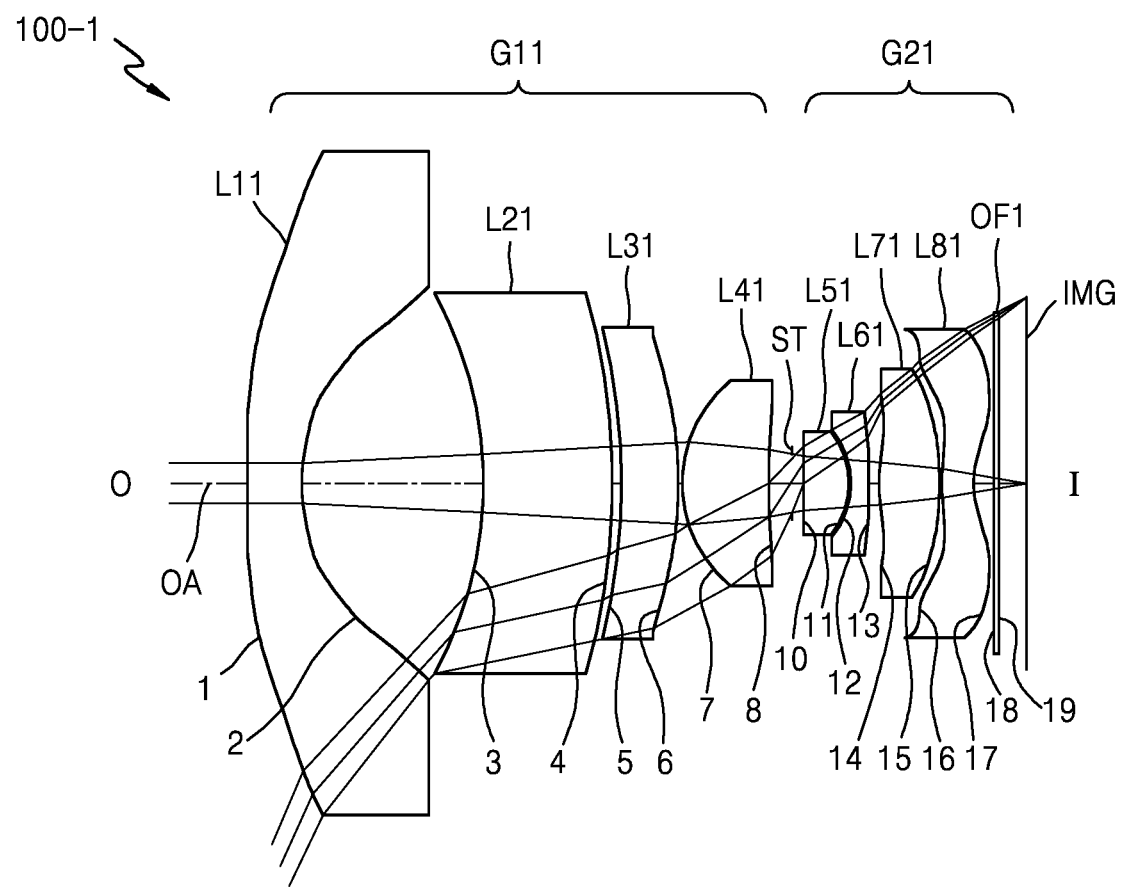
FIG. 1 illustrates an optical lens assembly according to a first embodiment.

Hereinafter, various embodiments of the present disclosure will be described with reference to the accompanying drawings. Reference will now be made in detail to embodiments, examples of which are illustrated in the accompanying drawing. However, it should be understood that the present disclosure is not limited to these particular embodiments but also includes various modifications, equivalents, and/or alternatives thereof. Accordingly, the embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

Throughout the specification and drawings, like reference numerals may be used to denote like elements or components.

When used herein, terms such as "comprise," "include," and "have" specify the presence of stated features (e.g., values, functions, operations, parts, elements, and components) but do not preclude the presence or addition of one or more other features.

As used herein, expressions such as "A or B," "at least one of A and/or B," and "one or more of A and/or B" may include any and all combinations of one or more of the associated listed items. For example, "A or B," "at least one of A and B," or "at least one of A or B" may denote all of the cases of (1) including at least one A, (2) including at least one B, and (3) including at least one A and at least one B.

Terms such as "first" and "second" used herein may refer to various elements or components regardless of their order and/or importance. These terms may be used only to distinguish one element or component from another element or component, and these elements or components should not be limited by these terms. For example, a first user device and a second user device may refer to different user devices regardless of their order or importance. For example, without departing from the scope of the present disclosure, a first component may be referred to as a second component, and vice versa.

It will be understood that when a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components). On the other hand, when a component (e.g., a first component) is referred to as being "directly coupled to/with" or "directly connected to/with" another component (e.g., a second component), no other components (e.g., third components) exist therebetween.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" on a hardware level. Instead, in some case, the expression "apparatus configured to . . . " may mean that the apparatus is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory device.

The terms used herein are just for the purpose of describing particular embodiments and are not intended to limit the scope of the present disclosure. As used herein, the singular forms "a," "an," and "the" may include the plural forms as well, unless the context clearly indicates otherwise. Unless otherwise defined, all terms (including technical or scientific terms) used herein may have the same meanings as commonly understood by those of ordinary skill in the art of the present disclosure. The terms defined in commonly used dictionaries may be interpreted as having the same meanings as the contextual meanings of the related art and will not be interpreted in an overly formal sense unless expressly so defined herein. In some cases, even the terms defined herein may not be interpreted to exclude the embodiments of the present disclosure.

An electronic apparatus according to various embodiments of the present disclosure may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Motion Picture Expert Group (MPEG) audio layer 3 (MP3) player, a mobile medical device, a camera, or a wearable device. According to various embodiments, the wearable device may include at least one of accessory-type devices (e.g., watches, rings, wristlets, anklets, necklaces, spectacles, contact lenses, or head-mounted devices (HMDs)), textile or clothing-integrated devices (e.g., electronic clothing), body-attachable devices (e.g., skin pads or tattoos), or bio-implantable devices (e.g., implantable circuits).

In some embodiments, the electronic apparatus may be a home appliance. The home appliance may include, for example, at least one of a television (TV), a digital video disk (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Goggle TV™), a game console (e.g., Xbox™ or PlayStation™), an electronic dictionary, an electronic key, a camcorder, or an electronic picture frame.

In other embodiments, the electronic apparatus may include at least one of any type of medical device (e.g., any type of portable medical meter (such as a blood sugar meter, a heart rate meter, a blood pressure meter, or a body temperature meter), a magnetic resonance angiography (MRA) device, a magnetic resonance imaging (MRI) device, a computerized tomography (CT) device, a tomography or an ultrasound machine, etc.), a navigation device, a global navigation satellite system (GNSS), an event data recorder (EDR), a flight data recorder (FDR), an automotive infotainment device, an electronic ship equipment (e.g., a ship navigation device or a gyrocompass), an avionic device, a security device, a vehicle head unit, an industrial or home robot, an automatic teller machine (ATM) of a financial institution, a point-of-sale (POS) device of a store, or an Internet-of-Things (IoT) device (e.g., an electric bulb, any type of sensor, an electricity or gas meter, a sprinkler, a fire alarm, a thermostat, a street lamp, a toaster, an exercise equipment, a hot-water tank, a heater, or a boiler).

According to some embodiments, the electronic apparatus may include at least one of a part of furniture or building/structure, an electronic board, an electronic signature receiving device, a projector, or any type of meter (e.g., a water meter, an electricity meter, a gas meter, or a radio wave meter). In various embodiments, the electronic apparatus may be any one or any combination of the above-described various devices. The electronic apparatus according to some embodiments may be a flexible electronic apparatus. Also, the electronic apparatus according to the embodiments of the present disclosure is not limited to the above-described devices and may include new electronic apparatuses resulting from technology development.

Hereinafter, electronic apparatuses according to various embodiments will be described with reference to the accompanying drawings. As used herein, the term "user" may refer to a person using the electronic apparatus, or an apparatus (e.g., an artificial intelligence (AI) electronic apparatus) using the electronic apparatus.

Hereinafter, optical lens assemblies and apparatuses including the same according to various embodiments will be described in detail with reference to the accompanying drawings.

FIG. 1 illustrates an optical lens assembly 100-1 according to a first embodiment.

The optical lens assembly 100-1 according to the first embodiment may include a first lens group G11 having positive refractive power and a second lens group G21 having positive refractive power, which are arranged from an object side O to an image side I. An iris diaphragm ST may be arranged between the first lens group G11 and the second lens group G21. The iris diaphragm ST may be configured to adjust the aperture for the light beam entering the optical lens assembly 100-1. The iris diaphragm ST may be, for example, an aperture diaphragm, a variable aperture, and a mask-type stop.

Hereinafter, for describing the configuration of each lens, for example, the image side may refer to the side facing an image plane IMG where an image is formed, and the object side may refer to the side facing an object. Also, for example, an object-side surface of a lens may refer to the lens surface facing the object (i.e., a left-side surface in the drawings), and an image-side surface thereof may refer to the lens surface facing the image plane IMG (i.e., a right-side surface in the drawings). The image plane IMG may be, for example, an imaging device surface or an image sensor surface. An image sensor may include, for example, a sensor such as a complementary metal oxide semiconductor (CMOS) or a charge-coupled device (CCD). The image sensor is not limited thereto and may be, for example, any device that is photosensitive and converts detected light beams into electrical image signals.

According to one embodiment, the first lens group G11 may include at least one negative lens and two positive lenses. The first lens group G11 may include a first negative lens L11, a second negative lens L21, a third positive lens L31, and a fourth positive lens L41 that are arranged from the object side O to the image side I. The second negative lens L21 may have an object-side surface 3 that is concave toward the object side O in its paraxial region. "Paraxial region" may refer to a region near the optical axis, i.e. a region within a predetermined radius from the optical axis.

The first negative lens L11 may have at least one inflection point on its object-side surface. "Inflection point" may refer to, for example, a point where the sign of curvature radius changes from (+) to (−) or from (−) to (+). Alternatively, "inflection point" may refer to, for example, a point where the shape of a lens changes from convex to concave or from concave to convex. The curvature radius (or radius of curvature) may be, for example, a value indicating the degree of curvature at each point on a curved surface or a curved line. On the object-side surface of the first negative lens L11, the center portion of the lens may be concave toward the object side O and the periphery portion of the lens may be convex toward the object side O. Each of the second negative lens L21 and the third positive lens L31 may have a meniscus shape that is concave toward the object side O. The fourth positive lens L41 may be a glass aspherical lens. The fourth positive lens L41 may include a convex object-side surface 7.

Each of the first negative lens L11 and the second negative lens L21 may be aspherical lenses to correct distortion aberration caused by having a wide viewing angle. Also, in the first lens group G11, the fourth positive lens L41 convex toward the object side O may be arranged near the iris diaphragm ST to correct coma aberration caused by off-axis rays. Each of the first negative lens L11, the second negative lens L21, the third positive lens L31, and the fourth positive lens L41 may be double-sided aspherical lenses.

The second lens group G21 may include a fifth positive lens L51, a sixth negative lens L61, a seventh positive lens L71, and an eighth lens L81. The sixth negative lens L61 may be concave toward the object side O. The seventh positive lens L71 may have be convex toward the image side I. The eighth lens L81 may have positive or negative refractive power. The eighth lens L81 may have an image-side surface 17 that is concave toward the image side I in its paraxial region. The eighth lens L81 may have at least one inflection point on each of its object-side surface 16 and the image-side surface 17.

An optical lens assembly according to one embodiment may have a viewing angle of 90 degrees to 135 degrees by including a first lens group having positive refractive power, an iris diaphragm, and a second lens group having positive refractive power. The refractive power ratio between the first lens group and the second lens group may be adjusted to reduce a change of image plane movement caused by temperature change. Also, aspherical lenses may be used in the first lens group and the second lens group to facilitate aberration correction even when the angle of a chief ray incident on the image plane (i.e., chief ray angle (CRA)) is large.

According to one embodiment, at least one optical device OF1 may be provided between the eighth lens L81 and the image plane IMG. The optical device OF1 may include, for example, at least one of a low-pass filter, an infrared (IR)-cut filter, and a cover glass. For example, when an IR-cut filter is provided as an optical device, visible rays may be pass through and IR rays may be redirected so that the IR rays are transmitted to the image plane. However, the optical lens assembly also may not include any such optical devices.

Figure 3:
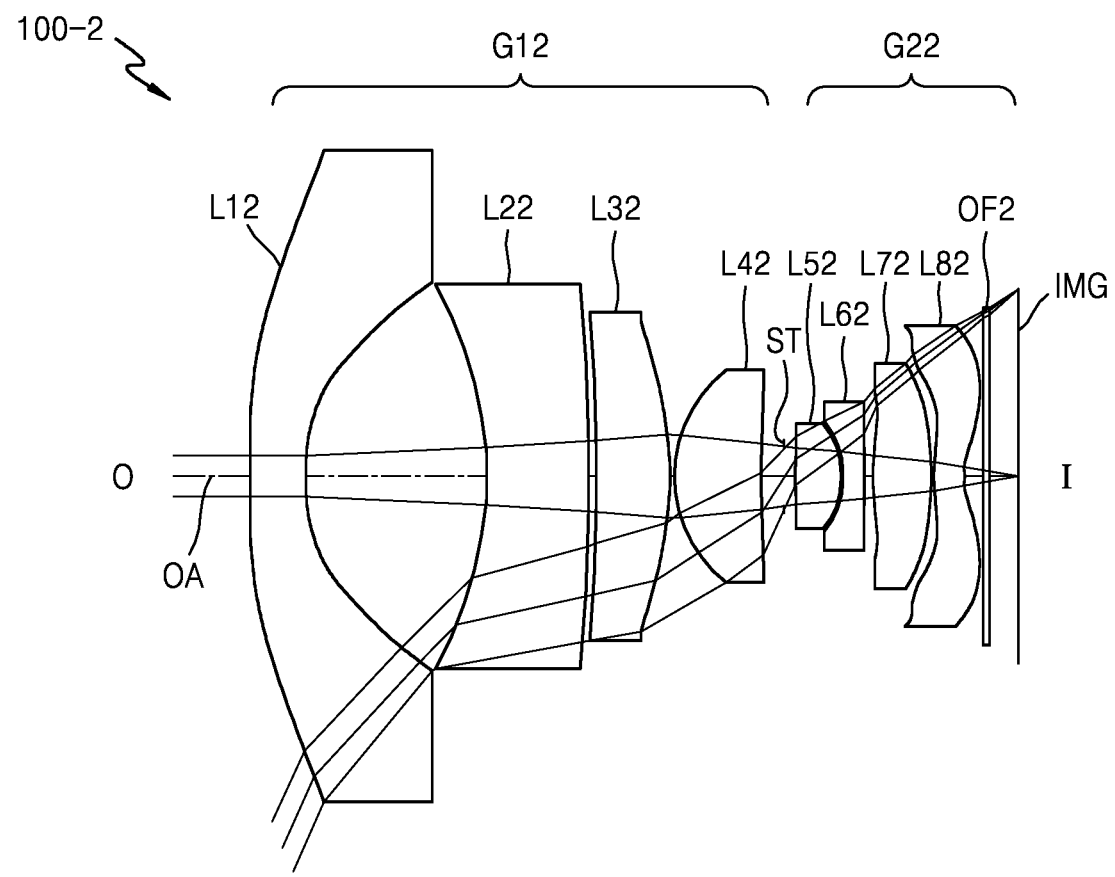
FIG. 3 illustrates an optical lens assembly according to a second embodiment.

FIG. 3 illustrates an optical lens assembly 100-2 according to a second embodiment.

The optical lens assembly 100-2 according to the second embodiment may include a first lens group G12 having positive refractive power and a second lens group G22 having positive refractive power, which are arranged from an object side O to an image side I. An iris diaphragm ST may be arranged between the first lens group G12 and the second lens group G22.

The first lens group G12 may include a first negative lens L12, a second negative lens L22, a third positive lens L32, and a fourth positive lens L42 that are arranged from the object side O to the image side I. The first negative lens L12 may have a meniscus shape convex toward the object side O. The second negative lens L22 may have a meniscus shape concave toward the object side O. The third positive lens L32 may have a meniscus shape concave toward the object side O. The fourth positive lens L42 may have a meniscus shape convex toward the object side O.

The first negative lens L12 and the fourth positive lens L42 may each be a glass aspherical lens. Each of the first negative lens L12 and the second negative lens L22 may be an aspherical lens to correct distortion aberration caused by having a wide viewing angle.

The second lens group G22 may include a fifth positive lens L52, a sixth negative lens L62, a seventh positive lens L72, and an eighth lens L82. The sixth negative lens L62 may have a shape concave toward the object side O. The seventh positive lens L72 may have a shape that is convex toward the object side O and convex toward the image side I. The eighth lens L82 may have negative refractive power. The eighth lens L82 may have an image-side surface that is concave toward the image side I in its paraxial region. The eighth lens L82 may have at least one inflection point on each of its object-side surface and the image-side surface. All of the lenses included in the first lens group and the second lens group may be aspherical lenses (e.g. glass or plastic aspherical lenses).

According to one embodiment, at least one optical device OF2 may be provided between the eighth lens L82 and the image plane IMG.

Figure 5:
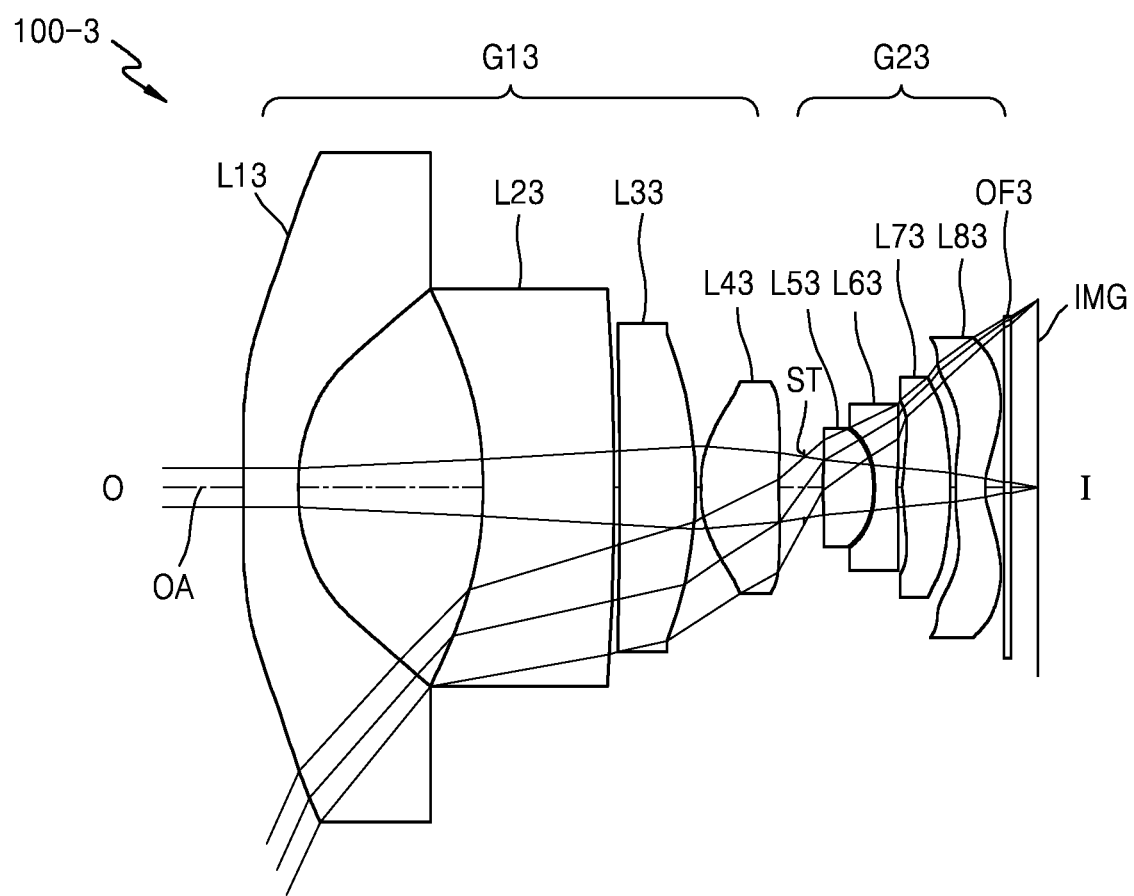
FIG. 5 illustrates an optical lens assembly according to a third embodiment.

FIG. 5 illustrates an optical lens assembly 100-3 according to a third embodiment.

The optical lens assembly 100-3 according to the third embodiment may include a first lens group G13 having positive refractive power and a second lens group G23 having positive refractive power, which are arranged from an object side O to an image side I. An iris diaphragm ST may be arranged between the first lens group G13 and the second lens group G23.

The first lens group G13 may include a first negative lens L13, a second negative lens L23, a third positive lens L33, and a fourth positive lens L43 that are arranged from the object side O to the image side I. The first negative lens L13 may have a meniscus shape convex toward the object side O. The second negative lens L23 may have a meniscus shape concave toward the object side O. The third positive lens L33 may have a meniscus shape concave toward the object side O. The fourth positive lens L43 may have a meniscus shape convex toward the object side O.

The second lens group G23 may include a fifth positive lens L53, a sixth negative lens L63, a seventh positive lens L73, and an eighth lens L83. The sixth negative lens L63 may have a shape that is concave toward the object side O and concave toward the image side I. The seventh positive lens L73 may have a shape that is convex toward the object side O and convex toward the image side I. The eighth lens L83 may have negative refractive power. The eighth lens L83 may have an image-side surface that is convex toward the object side O in its paraxial region, and may have a shape that is concave toward the image side I. The eighth lens L83 may have at least one inflection point on each of its object-side surface and the image-side surface. All of the lenses included in the first lens group and the second lens group may be aspherical lenses (e.g. glass or plastic aspherical lenses).

According to one embodiment, at least one optical device OF3 may be provided between the eighth lens L83 and the image plane IMG.

Figure 7:
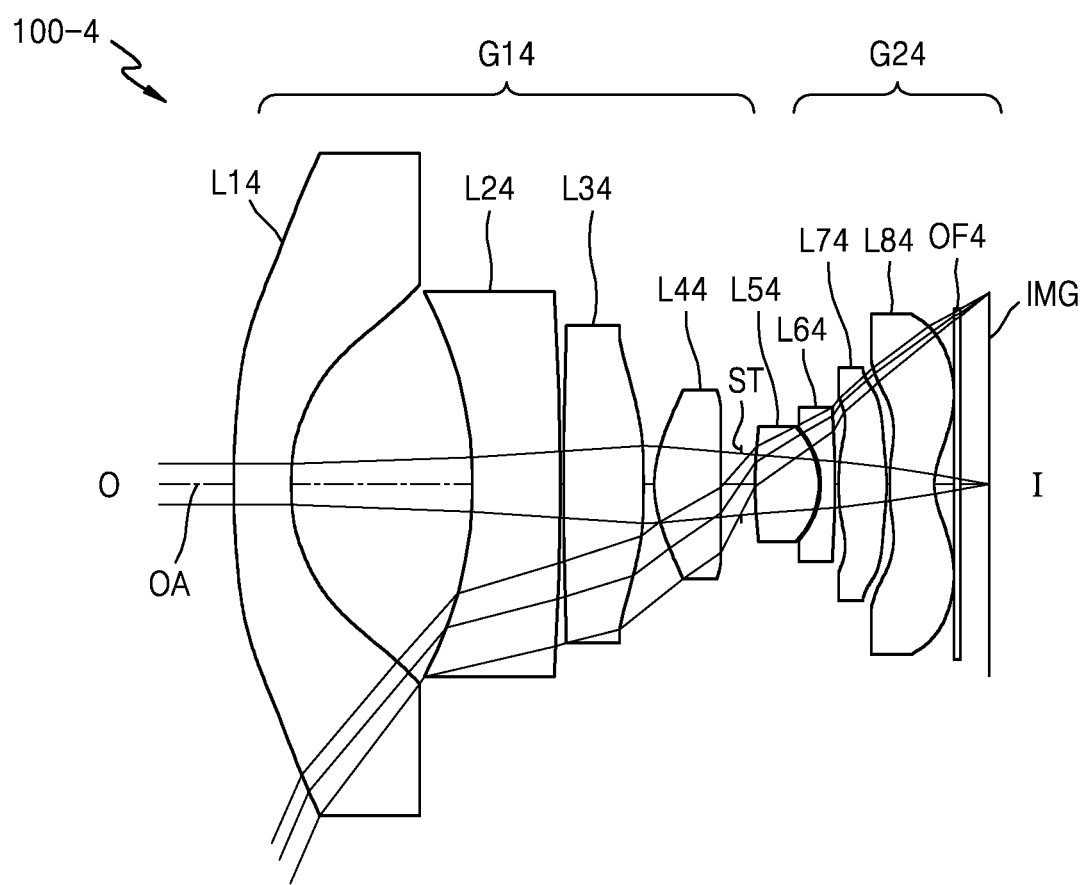
FIG. 7 illustrates an optical lens assembly according to a fourth embodiment.

FIG. 7 illustrates an optical lens assembly 100-4 according to a fourth embodiment.

The optical lens assembly 100-4 according to the fourth embodiment may include a first lens group G14 having positive refractive power and a second lens group G24 having positive refractive power, which are arranged from an object side O to an image side I. An iris diaphragm ST may be arranged between the first lens group G14 and the second lens group G24.

The first lens group G14 may include a first negative lens L14, a second negative lens L24, a third positive lens L34, and a fourth positive lens L44 that are arranged from the object side O to the image side I. The first negative lens L14 may have a meniscus shape convex toward the object side O. The second negative lens L24 may have a meniscus shape concave toward the object side O. The third positive lens L34 may have a meniscus shape concave toward the object side O. The fourth positive lens L44 may have a shape convex toward the object side O.

The second lens group G24 may include a fifth positive lens L54, a sixth negative lens L64, a seventh positive lens L74, and an eighth lens L84. The sixth negative lens L64 may have a shape that is concave toward the object side O and concave toward the image side I. The seventh positive lens L74 may have a shape that is convex toward the object side O and convex toward the image side I. The eighth lens L84 may have negative refractive power. The eighth lens L84 may have an image-side surface that is convex toward the object side O in its paraxial region, and may have a shape that is concave toward the image side I. The eighth lens L84 may have at least one inflection point on each of its object-side surface and the image-side surface. In the fourth embodiment, all of the lenses included in the first lens group and the second lens group may be aspherical lenses (e.g. glass or plastic aspherical lenses).

According to one embodiment, at least one optical device OF4 may be provided between the eighth lens L84 and the image plane IMG.

Figure 9:
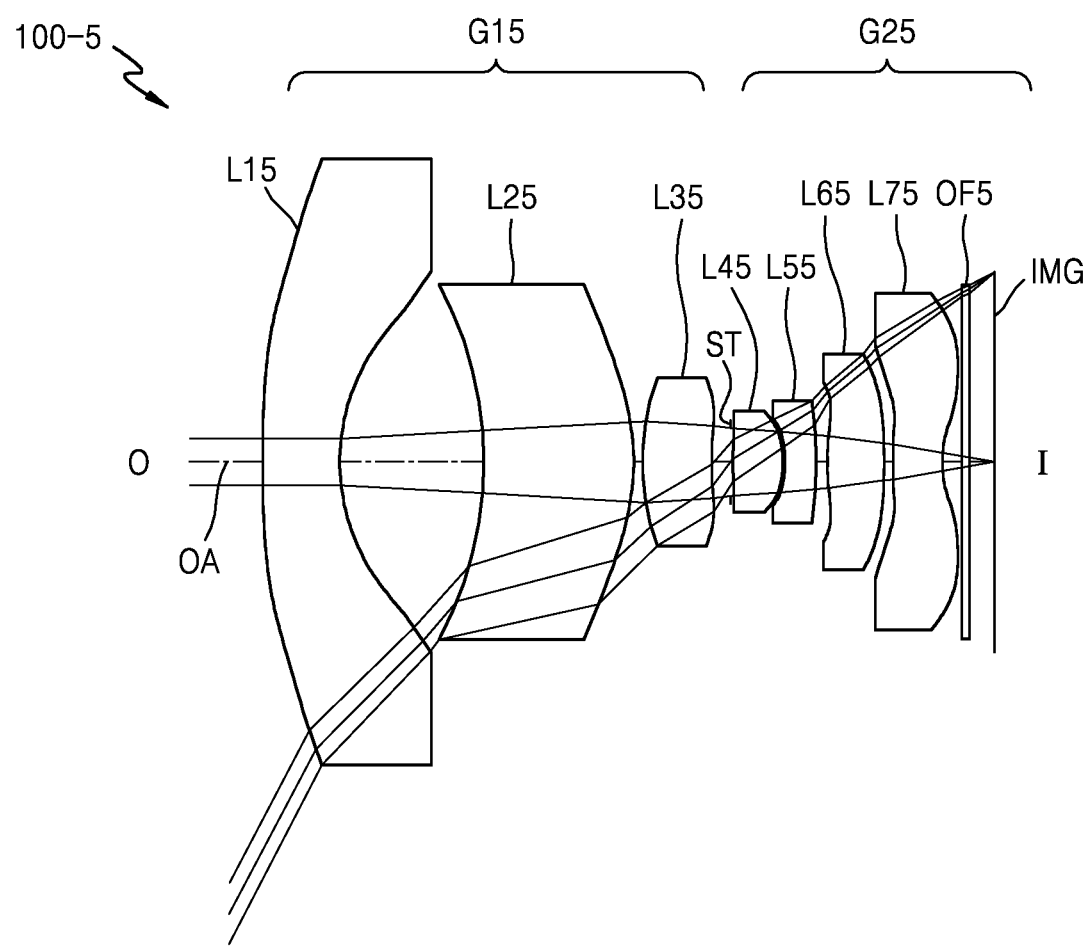
FIG. 9 illustrates an optical lens assembly according to a fifth embodiment.

FIG. 9 illustrates an optical lens assembly 100-5 according to a fifth embodiment.

The optical lens assembly 100-5 according to the fifth embodiment may include a first lens group G15 having positive refractive power and a second lens group G25 having positive refractive power, which are arranged from an object side O to an image side I. An iris diaphragm ST may be arranged between the first lens group G15 and the second lens group G25.

The first lens group G15 may include a first negative lens L15, a second positive lens L25, and a third positive lens L35 that are arranged from the object side O to the image side I. The first negative lens L15 may have a meniscus shape convex toward the object side O. The second positive lens L25 may have a meniscus shape concave toward the object side O. The third positive lens L35 may have a meniscus shape convex toward the object side O.

The second lens group G25 may include a fourth positive lens L45, a fifth negative lens L55, a sixth positive lens L65, and a seventh lens L75. The fifth negative lens L55 may have a shape that is concave toward the object side O and convex toward the image side I. The sixth positive lens L65 may have a shape that is convex toward the object side O and convex toward the image side I. The seventh lens L75 may have negative refractive power. The seventh lens L75 may have an image-side surface that is convex toward the object side O in its paraxial region, and may have a shape that is concave toward the image side I. The seventh lens L75 may have at least one inflection point on each of its object-side surface and the image-side surface. In the fifth embodiment, all of the lenses included in the first lens group and the second lens group may be aspherical lenses (e.g. glass or plastic aspherical lenses). The optical lens assembly according to the fifth embodiment may include seven lenses.

According to one embodiment, at least one optical device OF5 may be provided between the seventh lens L75 and the image plane IMG.

Figure 11:
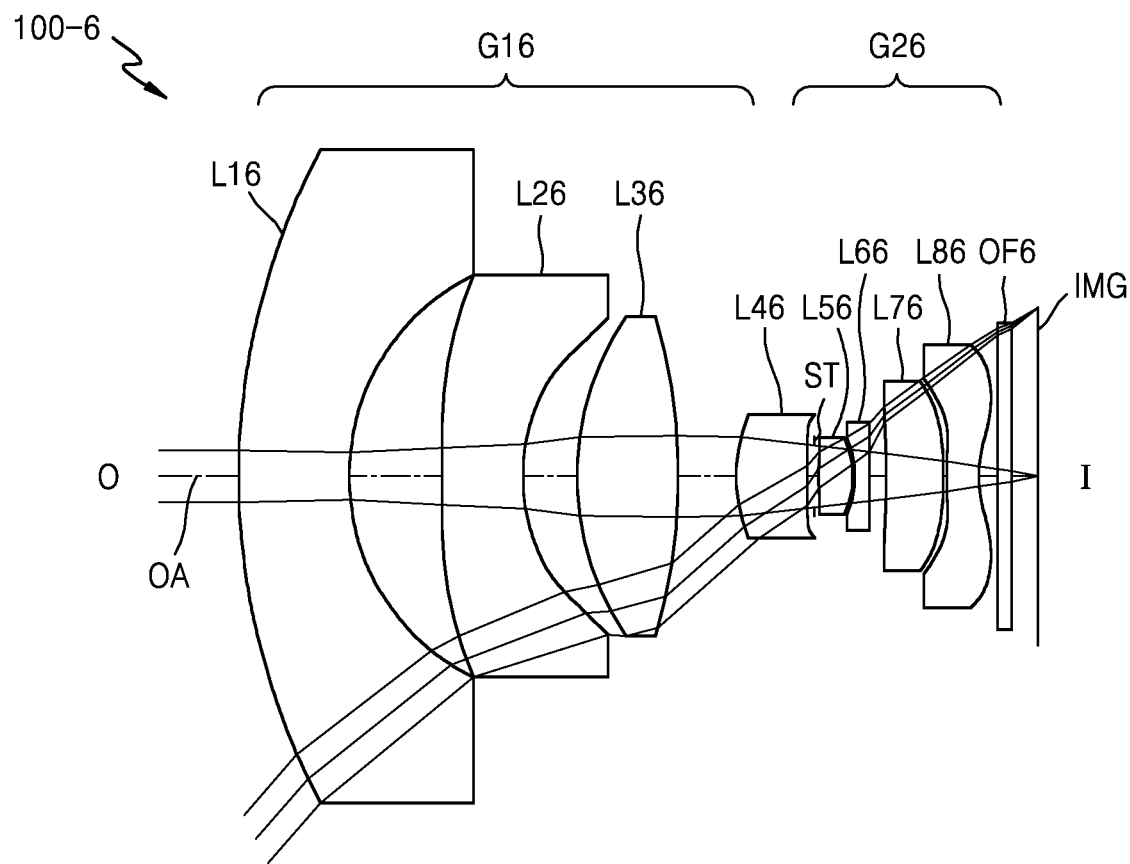
FIG. 11 illustrates an optical lens assembly according to a sixth embodiment.

FIG. 11 illustrates an optical lens assembly 100-6 according to a sixth embodiment.

The optical lens assembly 100-6 according to the sixth embodiment may include a first lens group G16 having positive refractive power and a second lens group G26 having positive refractive power, which are arranged from an object side O to an image side I. An iris diaphragm ST may be arranged between the first lens group G16 and the second lens group G26.

The first lens group G16 may include a first negative lens L16, a second negative lens L26, a third positive lens L36, and a fourth positive lens L46 that are arranged from the object side O to the image side I. The first negative lens L16 may have a meniscus shape convex toward the object side O. The second negative lens L26 may have an object-side surface that is concave toward the object side O in its paraxial region, and may have an image-side surface that is concave toward the image side I. The third positive lens L36 may be a biconvex lens. Each of the first negative lens L16 and the third positive lens L36 may be a glass spherical lens.

The second lens group G26 may include a fifth positive lens L56, a sixth negative lens L66, a seventh positive lens L76, and an eighth lens L86. The sixth negative lens L66 may have a shape that is concave toward the object side O and convex toward the image side I. The seventh positive lens L76 may have a shape that is convex toward the object side O and convex toward the image side I. The eighth lens L86 may have negative refractive power. The eighth lens L86 may have an image-side surface that is convex toward the object side O in its paraxial region, and may have a shape that is concave toward the image side I. The eighth lens L86 may have at least one inflection point on each of its object-side surface and the image-side surface. In the sixth embodiment, all of the lenses included in the first lens group and the second lens group may be aspherical lenses (e.g. glass or plastic aspherical lenses).

According to one embodiment, at least one optical device OF6 may be provided between the eighth lens L86 and the image plane IMG.

The optical lens assembly according to various embodiments may satisfy the following conditions. The following conditions will be described with reference to the optical lens assembly 100-1 according to the first embodiment illustrated in FIG. 1. However, the following conditions may also be applied to other embodiments.

$$1.5 < \frac{fb}{fa} < 25 \qquad (1)$$

Herein, "fa" denotes a focal length of the first lens group and "fb" denotes a focal length of the second lens group.

Condition (1) defines the ratio between the focal length "fa" of the first lens group and the focal length "fb" of the second lens group. When Condition (1) is satisfied, the optical lens assembly according to various embodiments may have a viewing angle of 90 degrees to 135 degrees and may reduce distortion aberration to be within −30%. Also, when Condition (1) is satisfied, variations of image plane position due to a temperature change may be reduced. And when each of the first lens group and the second lens group has positive refractive power, correcting distortions caused by temperature changes may be easily performed.

When (fb/fa) exceeds an upper limit of Condition (1), the refractive power of the second lens group may decrease and thus changes of the nodal point in the second lens group may increase due to a temperature change. Thus, the variation of the image plane position may increase. In order to reduce the movement of the image plane caused by ambient temperature change in an optical system including seven or eight lenses, the refractive power difference between a first lens group and a second lens may not be large.

When (fb/fa) is smaller than a lower limit of Condition (2), the refractive power of the first lens group may decrease and correcting coma aberration, astigmatism, and distortion aberration may become difficult.

The optical lens assembly according to various embodiments may also satisfy the following condition.

$$1.5 < \frac{fap}{f} < 4.5 \qquad (2)$$

Herein, "f" denotes a focal length of the optical lens assembly and "fap" denotes a focal length of the lens located closest to the image side in the first lens group.

Condition (2) defines the ratio between the focal length "fap" of the closest image-side lens of the first lens group and the focal length "f" of the entire optical lens assembly. When (f/fap) exceeds an upper limit of Condition (2), the refractive power of the first lens group may decrease and thus distortion aberration, coma aberration, and astigmatism may increase. When (f/fap) is smaller than a lower limit of Condition (2), the refractive power of the second lens group may decrease and it may be difficult to control the chief ray angle (CRA) between the image plane and a chief ray incident at the maximum image height of the image sensor.

The optical lens assembly according to various embodiments may also satisfy the following condition.

$$1.5 < \frac{f4}{f} < 4.5 \quad (3)$$

Herein, "f" denotes a focal length of the optical lens assembly and "f4" denotes a focal length of the fourth lens. Condition (2) and Condition (3) may be substantially the same when the fourth lens is the closest image-side lens of the first lens group.

When (f4/f) exceeds an upper limit of Condition (3), the refractive power of the fourth lens may decrease and thus distortion aberration, coma aberration, and astigmatism may increase. When (f4/1) is smaller than a lower limit of Condition (3), it may be difficult to control the chief ray angle (CRA) between the image plane and a chief ray incident on the image plane of the image sensor.

When Condition (3) is satisfied, the image plane movement caused by temperature change may be reduced and it may be possible to configure an optical system that has excellent optical performance and small movement of the image plane even when ambient temperature fluctuates.

The optical lens assembly according to various embodiments may also satisfy the following condition.

$$25 < |CRA_{Max}| < 40 \quad (4)$$

Herein, "$CRA_{Max}$" denotes an angle between a normal line of the image sensor and a chief ray that is incident at the maximum image height of the image sensor. When a chief ray incident on the image sensor forms an angle counterclockwise with respect to the normal line of the image sensor, the sign of the CRA value may be negative (−). Conversely, and when the chief ray forms an angle in the clockwise direction, the sign of the CRA value may be positive (+).

When the optical lens assembly satisfies Condition (4), the optical lens assembly may be miniaturized.

The aspherical surface used in the optical lens assembly according to various embodiments may be defined as follows.

When an optical axis direction is set to an x axis and a direction perpendicular to the optical axis direction is set to a Y axis, an aspherical shape may be represented as the following condition with the positive traveling direction of rays. Herein, "x" denotes the distance in the optical axis direction from the vertex of the lens, "y" denotes the distance in the direction perpendicular to the optical axis, "K" denotes a conic constant, "A, B, C, D, . . . " denote aspherical coefficients, and "c" denotes a reciprocal number (1/R) of the curvature radius at the vertex of the lens.

$$x = \frac{cy^3}{1 + \sqrt{1 - (K+1)c^2 y^2}} + Ay^4 + By^6 + Cy^8 + Dy^{10} + \ldots \quad (5)$$

According to the inventive concept, an optical lens assembly may be implemented by various embodiments according to various designs as follows.

In each embodiment, lens surface numbers 1, 2, 3 . . . n ("n" is a natural number) are added sequentially from the object side O to the image side I. For the sake of convenience, the lens surface numbers are shown only in FIG. 1. Herein, "f" denotes a focal length of an optical lens assembly, "EFL" denotes a focal length of each lens, "Fno" denotes an F number, "2w" denotes a viewing angle, "R" denotes a curvature radius, "Dn" denotes a thickness of a lens or an air gap between lenses, "nd" denotes a refractive index, and "vd" denotes an Abbe number. Also, "ST" denotes an iris diaphragm, "obj" denotes an object, and "IMG" denotes an image plane. "*" denotes an aspherical surface.

First Embodiment

FIG. 1 illustrates an optical lens assembly according to a first embodiment. Table 1 shows, for example, design data of the first embodiment.

f: 2.19 mm  Fno: 2.91  2w: 131.93°

TABLE 1

| Lens surface | R | Dn | nd | vd | EFL |
|---|---|---|---|---|---|
| obj | infinity | | | | |
| 1* | −169.354 | 1.053 | 1.5441 | 56.09 | −7.927 |
| 2* | 4.435 | 3.531 | | | |
| 3* | −6.685 | 2.466 | 1.65038 | 21.52 | −25.667 |
| 4* | −12.773 | 0.174 | | | |
| 5* | −12.163 | 1.102 | 1.63493 | 23.89 | 22.95 |
| 6* | −6.863 | 0.1 | | | |
| 7* | 2.489 | 1.672 | 1.58916 | 60.62 | 4.607 |
| 8* | 22.542 | 0.442 | | | |
| ST | infinity | 0.243 | | | |
| 10* | 74.86 | 0.867 | 1.5441 | 56.09 | 3.209 |
| 11* | −1.78 | 0.032 | | | |
| 12* | −1.603 | 0.351 | 1.65038 | 21.52 | −2.66 |
| 13* | −23.738 | 0.202 | | | |
| 14* | 4.814 | 1.161 | 1.5348 | 55.71 | 3.718 |
| 15* | −3.102 | 0.05 | | | |
| 16* | 4.076 | 0.608 | 1.5348 | 55.71 | −4.305 |
| 17* | 1.395 | 0.38 | | | |
| 18 | infinity | 0.11 | 1.5168 | 64.2 | infinity |
| 19 | infinity | 0.523 | | | |
| IMG | infinity | | | | |

Table 2 shows aspherical coefficients in the first embodiment.

TABLE 2

| | Lens surface | | | | | |
|---|---|---|---|---|---|---|
| | 1 | 2 | 3 | 4 | 5 | 6 |
| K(Conic) | −50.0000 | −0.7526 | −0.0933 | −2.2349 | 5.1206 | −6.7171 |
| A(4th) | 4.9075E−03 | 6.2251E−03 | 2.0702E−04 | 2.5333E−04 | 3.1982E−04 | 2.6897E−04 |
| B(6th) | −2.4337E−04 | 4.2033E−04 | 3.0640E−05 | −1.2369E−05 | 1.4825E−05 | −9.0331E−05 |
| C(8th) | 5.8947E−06 | −5.0664E−05 | 0.0000E+00 | 0.0000E+00 | 0.0000E+00 | 8.5121E−06 |
| D(10th) | −7.3743E−08 | −7.7521E−07 | 0.0000E+00 | 0.0000E+00 | 0.0000E+00 | 0.0000E+00 |
| E(12th) | 4.1134E−10 | 9.7448E−08 | 0.0000E+00 | 0.0000E+00 | 0.0000E+00 | 0.0000E+00 |

TABLE 2-continued

| | Lens surface | | | | | |
|---|---|---|---|---|---|---|
| | 7 | 8 | 10 | 11 | 12 | 13 |
| K(Conic) | −0.1789 | 30.0000 | 0.0000 | 0.9155 | 0.7023 | −34.4763 |
| A(4th) | 2.2581E−03 | 9.5080E−04 | −1.6576E−02 | −9.4017E−03 | 3.3154E−02 | −2.9331E−02 |
| B(6th) | 1.2438E−04 | −1.9251E−03 | −8.4130E−03 | −2.1367E−03 | −2.1176E−03 | 1.7747E−02 |
| C(8th) | −6.0488E−05 | 3.9541E−04 | −2.0135E−02 | −3.4035E−02 | −3.8762E−03 | −1.1710E−03 |
| D(10th) | −1.2451E−05 | −2.5147E−05 | 2.3319E−02 | 1.9877E−02 | 1.1644E−02 | −4.8000E−04 |
| E(12th) | 0.0000E+00 | 0.0000E+00 | 0.0000E+00 | 0.0000E+00 | 0.0000E+00 | 0.0000E+00 |

| | Lens surface | | | |
|---|---|---|---|---|
| | 14 | 15 | 16 | 17 |
| K(Conic) | 0.1725 | −38.6336 | 0.5652 | −6.8660 |
| A(4th) | −2.7785E−02 | 1.7406E−02 | −8.2047E−02 | −2.9415E−02 |
| B(6th) | −4.4581E−03 | −1.3688E−02 | 3.6388E−03 | 2.7519E−03 |
| C(8th) | 1.0923E−03 | 1.6565E−03 | 1.4591E−03 | −1.2674E−04 |
| D(10th) | −7.7426E−05 | −2.2333E−07 | −1.3443E−04 | 0.0000E+00 |
| E(12th) | 0.0000E+00 | 0.0000E+00 | 0.0000E+00 | 0.0000E+00 |

Figure 2:
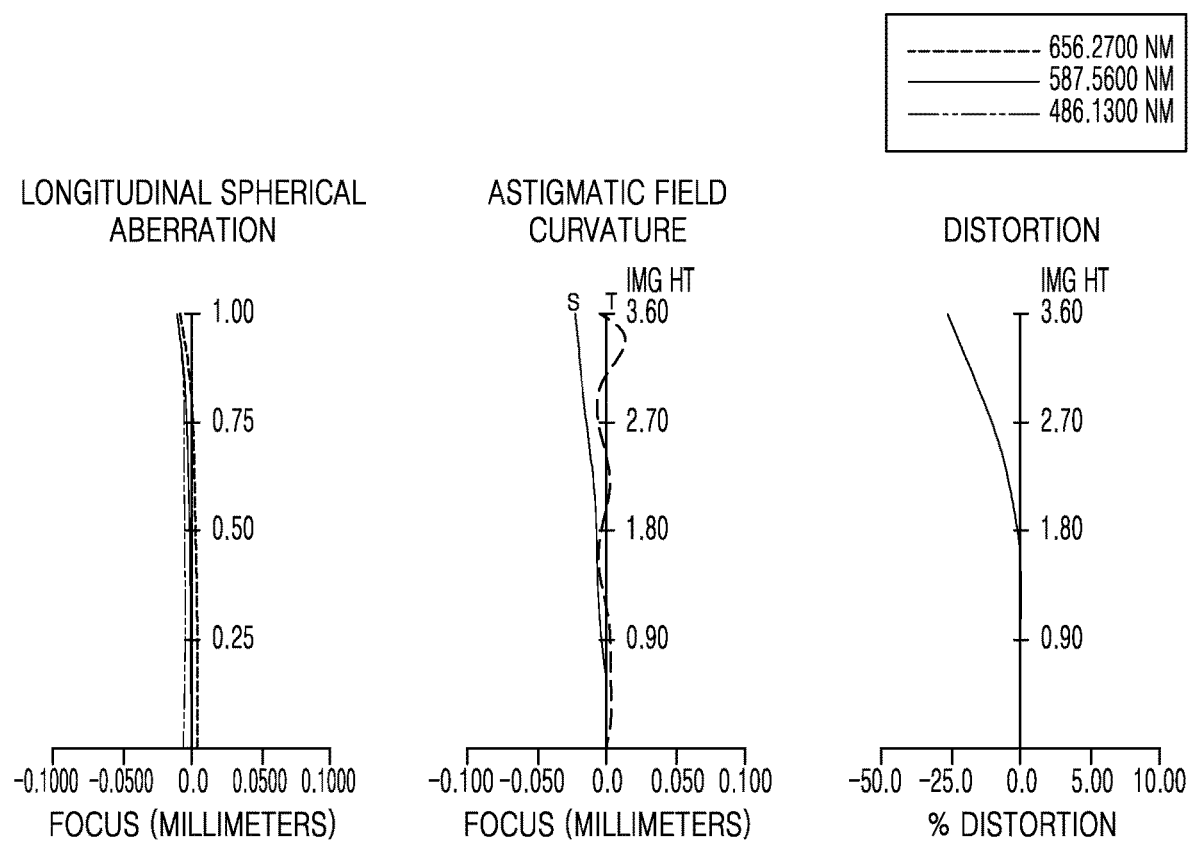
FIG. 2 is an aberration diagram of an optical lens assembly according to the first embodiment.

FIG. 2 illustrates longitudinal spherical aberration, astigmatic field curvature, and distortion aberration of the optical lens assembly according to the first embodiment. The longitudinal spherical aberration is measured at wavelengths of 656.2700 nanometers (nm), 587.560 nm, and 486.1300 nm, and the astigmatic field curvature includes a tangential field curvature T and a sagittal field curvature S. The astigmatic field curvature is measured at a wavelength of 587.5600 nm, and the distortion aberration is measured at a wavelength of 587.5600 nm.

Second Embodiment

FIG. 3 illustrates an optical lens assembly according to a second embodiment. Table 3 shows, for example, design data of the second embodiment.

f: 2.19 mm Fno: 2.90 2w: 131.81°

TABLE 3

| Lens surface | R | Dn | nd | vd | EFL |
|---|---|---|---|---|---|
| obj | infinity | infinity | | | |
| 1* | 500 | 1.053 | 1.58916 | 60.62 | −7.466 |
| 2* | 4.357 | 3.515 | | | |
| 3* | −6.774 | 1.964 | 1.65038 | 21.52 | −12.682 |
| 4* | −42.222 | 0.156 | | | |
| 5* | −36.73 | 1.422 | 1.63493 | 23.89 | 12.636 |
| 6* | −6.683 | 0.1 | | | |
| 7* | 2.486 | 1.661 | 1.58916 | 60.62 | 4.737 |
| 8* | 17.144 | 0.471 | | | |
| sto | infinity | 0.223 | | | |
| 10* | 23.514 | 0.877 | 1.5441 | 56.09 | 3.396 |
| 11* | −1.979 | 0.028 | | | |
| 12* | −1.846 | 0.44 | 1.65038 | 21.52 | −2.822 |
| 13* | 375.534 | 0.156 | | | |
| 14* | 5.054 | 1.129 | 1.5348 | 55.71 | 3.852 |
| 15* | −3.207 | 0.05 | | | |
| 16* | 3.72 | 0.58 | 1.5348 | 55.71 | −4.593 |
| 17* | 1.399 | 0.38 | | | |
| 18 | infinity | 0.11 | 1.5168 | 64.2 | infinity |
| 19 | infinity | 0.574 | | | |
| IMG | infinity | | | | |

Table 4 shows aspherical coefficients in the second embodiment.

TABLE 4

| | Lens surface | | | | | |
|---|---|---|---|---|---|---|
| | 1 | 2 | 3 | 4 | 5 | 6 |
| K(Conic) | −30.0000 | −0.6975 | −0.1285 | −1.5397 | 14.8436 | −5.7206 |
| A(4th) | 4.8786E−03 | 6.5766E−03 | 2.1624E−04 | 1.4030E−04 | 2.5440E−04 | 3.2255E−04 |
| B(6th) | −2.4517E−04 | 3.6511E−04 | 2.2605E−05 | −5.2969E−06 | −3.0704E−06 | −7.8026E−05 |
| C(8th) | 5.9000E−06 | −5.0284E−05 | 4.2203E−08 | 0.0000E+00 | 0.0000E+00 | 6.5493E−06 |
| D(10th) | −7.3405E−08 | −7.0584E−07 | 0.0000E+00 | 0.0000E+00 | 0.0000E+00 | 0.0000E+00 |
| E(12th) | 4.1641E−10 | 9.7448E−08 | 0.0000E+00 | 0.0000E+00 | 0.0000E+00 | 0.0000E+00 |

| | Lens surface | | | | | |
|---|---|---|---|---|---|---|
| | 7 | 8 | 10 | 11 | 12 | 13 |
| K(Conic) | −0.1194 | 12.5582 | 8.1239 | 0.6759 | 1.1075 | 90.0000 |
| A(4th) | 5.4461E−04 | 9.0423E−05 | −1.5054E−02 | −3.2989E−02 | 8.9460E−03 | −3.0228E−02 |
| B(6th) | 2.3602E−05 | −1.7830E−03 | −6.3236E−03 | −8.4955E−03 | −5.2304E−03 | 1.5624E−02 |
| C(8th) | −9.0081E−05 | 2.8334E−04 | −9.7193E−03 | −3.1898E−02 | −6.6465E−03 | −1.4261E−03 |
| D(10th) | −1.7286E−05 | 0.0000E+00 | 1.8799E−02 | 2.3033E−02 | 1.3602E−02 | −1.5364E−04 |
| E(12th) | 0.0000E+00 | 0.0000E+00 | 0.0000E+00 | 0.0000E+00 | 0.0000E+00 | 0.0000E+00 |

TABLE 4-continued

| | Lens surface | | | |
|---|---|---|---|---|
| | 14 | 15 | 16 | 17 |
| K(Conic) | 2.7430 | −40.9818 | 0.3716 | −6.9169 |
| A(4th) | −2.8170E−02 | 1.9091E−02 | −8.2607E−02 | −3.0383E−02 |
| B(6th) | −6.3268E−03 | −1.4042E−02 | 3.3974E−03 | 2.6738E−03 |
| C(8th) | 1.4007E−03 | 1.6022E−03 | 1.4428E−03 | −1.1613E−04 |
| D(10th) | −4.5446E−05 | 1.2142E−05 | −1.3210E−04 | 0.0000E+00 |
| E(12th) | 0.0000E+00 | 0.0000E+00 | 0.0000E+00 | 0.0000E+00 |

Figure 4:
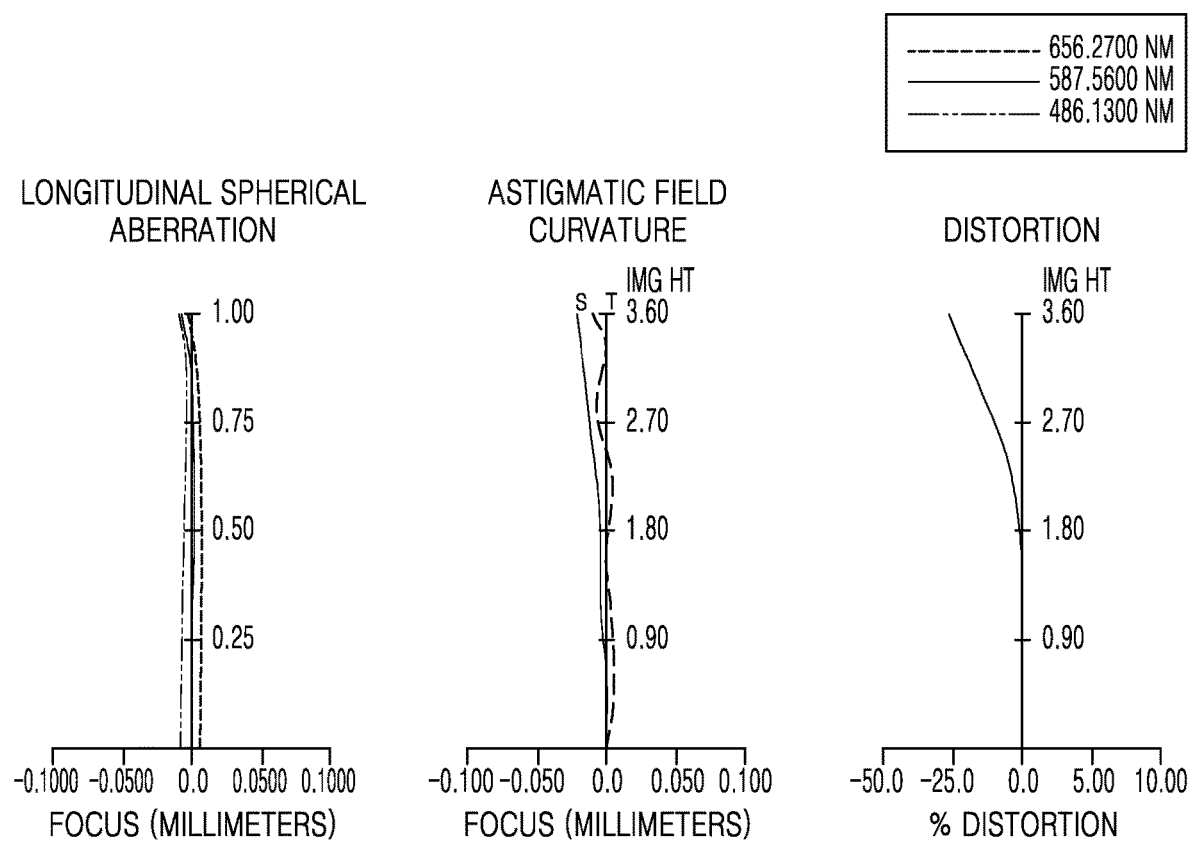
FIG. 4 is an aberration diagram of an optical lens assembly according to the second embodiment.

FIG. 4 illustrates longitudinal spherical aberration, astigmatic field curvature, and distortion aberration of the optical lens assembly according to the second embodiment.

Third Embodiment

FIG. 5 illustrates an optical lens assembly according to a third embodiment. Table 5 shows, for example, design data of the third embodiment.

f: 2.18 mm Fno: 2.88 2w: 132.07°

TABLE 5

| Lens surface | R | Dn | nd | vd | EFL |
|---|---|---|---|---|---|
| obj | infinity | infinity | | | |
| 1* | 261.414 | 1.066 | 1.5441 | 56.09 | −8.017 |
| 2* | 4.284 | 3.564 | | | |
| 3* | −6.99 | 2.516 | 1.65038 | 21.52 | −12.411 |
| 4* | −59.583 | 0.1 | | | |
| 5* | −64.298 | 1.47 | 1.68893 | 31.16 | 10.906 |

TABLE 5-continued

| Lens surface | R | Dn | nd | vd | EFL |
|---|---|---|---|---|---|
| 6* | −6.79 | 0.1 | | | |
| 7* | 2.495 | 1.494 | 1.5441 | 56.09 | 5.1 |
| 8* | 19.508 | 0.49 | | | |
| ST | infinity | 0.359 | | | |
| 10* | 10.557 | 0.975 | 1.5441 | 56.09 | 3.369 |
| 11* | −2.146 | 0.028 | | | |
| 12* | −1.983 | 0.431 | 1.65038 | 21.52 | −2.648 |
| 13* | 14.221 | 0.114 | | | |
| 14* | 5.441 | 0.896 | 1.5348 | 55.71 | 4.193 |
| 15* | −3.595 | 0.09 | | | |
| 16* | 3.419 | 0.58 | 1.5348 | 55.71 | −5.397 |
| 17* | 1.473 | 0.38 | | | |
| 18 | infinity | 0.11 | 1.5168 | 64.2 | infinity |
| 19 | infinity | 0.524 | | | |
| img | infinity | | | | |

Table 6 shows aspherical coefficients in the third embodiment.

TABLE 6

| | Lens surface | | | | | |
|---|---|---|---|---|---|---|
| | 1 | 2 | 3 | 4 | 5 | 6 |
| K(Conic) | 3.0000 | −0.6743 | 0.0325 | 0.0000 | 25.0000 | −5.1260 |
| A(4th) | 4.8517E−03 | 6.8223E−03 | 8.2522E−05 | 6.1772E−05 | 2.3749E−04 | 1.0485E−05 |
| B(6th) | −2.4714E−04 | 3.2590E−04 | 1.6384E−05 | −6.0593E−06 | 7.9003E−07 | −7.8406E−05 |
| C(8th) | 5.9739E−06 | −4.8115E−05 | 7.0619E−07 | 0.0000E+00 | 0.0000E+00 | 8.1716E−06 |
| D(10th) | −7.2825E−08 | −7.3457E−07 | 0.0000E+00 | 0.0000E+00 | 0.0000E+00 | 0.0000E+00 |
| E(12th) | 3.8452E−10 | 9.7448E−08 | 0.0000E+00 | 0.0000E+00 | 0.0000E+00 | 0.0000E+00 |

| | Lens surface | | | | | |
|---|---|---|---|---|---|---|
| | 7 | 8 | 10 | 11 | 12 | 13 |
| K(Conic) | −0.1978 | 10.0146 | −0.3538 | 2.1240 | 1.6201 | 3.1605 |
| A(4th) | −1.1562E−03 | −5.8055E−03 | −1.1378E−02 | −3.8563E−02 | −1.8633E−02 | −3.2938E−02 |
| B(6th) | −7.9473E−04 | −4.3091E−03 | −5.4709E−03 | 2.0680E−02 | 1.1416E−02 | 1.1555E−02 |
| C(8th) | −1.2666E−04 | 6.3113E−04 | 7.5514E−03 | −2.0978E−02 | −3.0700E−03 | −1.8755E−03 |
| D(10th) | −1.0597E−04 | −3.7160E−05 | −5.4937E−03 | 7.6189E−03 | 0.0000E+00 | 2.2951E−04 |
| E(12th) | 0.0000E+00 | 0.0000E+00 | 0.0000E+00 | 0.0000E+00 | 0.0000E+00 | 0.0000E+00 |

| | Lens surface | | | |
|---|---|---|---|---|
| | 14 | 15 | 16 | 17 |
| K(Conic) | 3.8273 | −38.0000 | 0.0000 | −6.5482 |
| A(4th) | −1.7938E−02 | 3.5374E−02 | −7.6287E−02 | −3.0060E−02 |
| B(6th) | −1.1994E−02 | −2.0558E−02 | 2.9064E−03 | 2.4807E−03 |
| C(8th) | 7.8951E−04 | 2.4617E−03 | 1.2543E−03 | −1.2536E−04 |
| D(10th) | 0.0000E+00 | −2.7670E−05 | −1.1231E−04 | 0.0000E+00 |
| E(12th) | 0.0000E+00 | 0.0000E+00 | 0.0000E+00 | 0.0000E+00 |

Figure 6:
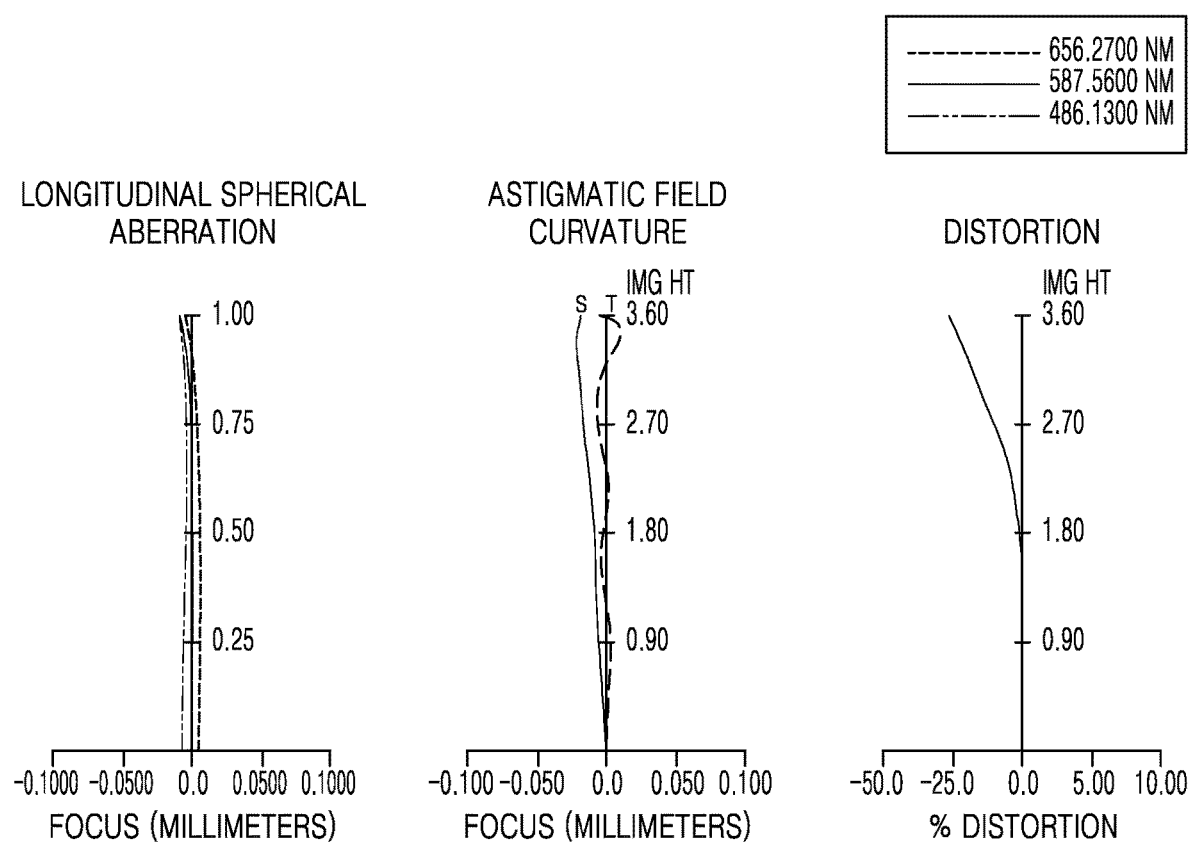
FIG. 6 is an aberration diagram of an optical lens assembly according to the third embodiment.

FIG. 6 illustrates longitudinal spherical aberration, astigmatic field curvature, and distortion aberration of the optical lens assembly according to the third embodiment.

Fourth Embodiment

FIG. 7 illustrates an optical lens assembly according to a fourth embodiment. Table 7 shows, for example, design data of the fourth embodiment.

f: 2.10 mm Fno: 2.87 2w: 133.04°

TABLE 7

| Lens surface | R | Dn | nd | vd | EFL |
|---|---|---|---|---|---|
| obj | infinity | infinity | | | |
| 1* | 126.554 | 1.08 | 1.5441 | 56.09 | −8.405 |
| 2* | 4.401 | 3.436 | | | |
| 3* | −6.881 | 1.668 | 1.65038 | 21.52 | −11.576 |
| 4* | −87.673 | 0.1 | | | |
| 5* | −198.122 | 1.494 | 1.63493 | 23.89 | 9.678 |
| 6* | −5.977 | 0.215 | | | |
| 7* | 2.797 | 1.243 | 1.5441 | 56.09 | 5.678 |
| 8* | 24.952 | 0.393 | | | |
| ST | infinity | 0.266 | | | |
| 10* | 11.087 | 1.196 | 1.5441 | 56.09 | 3.512 |
| 11* | −2.221 | 0.025 | | | |
| 12* | −2.014 | 0.28 | 1.65038 | 21.52 | −2.813 |
| 13* | 21.007 | 0.102 | | | |
| 14* | 4.236 | 0.893 | 1.5348 | 55.71 | 3.902 |
| 15* | −3.81 | 0.05 | | | |
| 16* | 2.858 | 0.864 | 1.5348 | 55.71 | −5.989 |
| 17* | 1.351 | 0.38 | | | |
| 18 | infinity | 0.11 | 1.5168 | 64.2 | infinity |
| 19 | infinity | 0.525 | | | |
| IMGS | infinity | | | | |

Table 8 shows aspherical coefficients in the fourth embodiment.

TABLE 8

| | Lens surface | | | | | |
|---|---|---|---|---|---|---|
| | 1 | 2 | 3 | 4 | 5 | 6 |
| K(Conic) | −10.0000 | −0.6849 | 0.0000 | 0.0000 | 35.0000 | −6.6890 |
| A(4th) | 5.3833E−03 | 8.0491E−03 | 3.4931E−04 | −4.9232E−05 | 4.7503E−04 | 5.5556E−04 |
| B(6th) | −2.8836E−04 | 2.3862E−04 | 2.6836E−05 | −9.7557E−06 | 1.7986E−05 | −3.4418E−05 |
| C(8th) | 7.7247E−06 | −5.5343E−05 | −3.7397E−09 | 0.0000E+00 | 0.0000E+00 | 6.9002E−06 |
| D(10th) | −1.1142E−07 | 2.5870E−07 | 0.0000E+00 | 0.0000E+00 | 0.0000E+00 | 0.0000E+00 |
| E(12th) | 7.2876E−10 | 6.5580E−08 | 0.0000E+00 | 0.0000E+00 | 0.0000E+00 | 0.0000E+00 |

| | Lens surface | | | | | |
|---|---|---|---|---|---|---|
| | 7 | 8 | 10 | 11 | 12 | 13 |
| K(Conic) | −0.2081 | 0.0000 | −0.1250 | 1.7037 | 1.2046 | 0.1198 |
| A(4th) | −1.6342E−03 | −7.0778E−03 | −1.8595E−02 | −3.7158E−02 | 9.1740E−03 | −5.4959E−02 |
| B(6th) | −5.9719E−04 | −3.5825E−03 | 1.7433E−02 | −1.6986E−02 | −3.9289E−02 | 2.3769E−02 |
| C(8th) | −1.5857E−04 | 5.8982E−04 | −3.7087E−02 | −4.2818E−02 | 6.5257E−04 | −5.2484E−03 |
| D(10th) | −1.0870E−04 | −5.4109E−05 | 3.0467E−02 | 3.0813E−02 | 9.3950E−03 | 9.5539E−04 |
| E(12th) | 0.0000E+00 | 0.0000E+00 | 0.0000E+00 | 0.0000E+00 | 0.0000E+00 | 0.0000E+00 |

| | Lens surface | | | |
|---|---|---|---|---|
| | 14 | 15 | 16 | 17 |
| K(Conic) | 4.6052 | −36.3830 | 0.0990 | −5.7615 |
| A(4th) | −2.4193E−02 | 5.0739E−02 | −9.6163E−02 | −2.7840E−02 |
| B(6th) | −1.7115E−02 | −3.1571E−02 | −1.5918E−02 | 2.0935E−03 |
| C(8th) | 1.1240E−03 | 4.9303E−03 | 3.5869E−03 | −5.2747E−05 |
| D(10th) | 0.0000E+00 | −1.8658E−04 | −3.4109E−04 | −3.5246E−06 |
| E(12th) | 0.0000E+00 | 0.0000E+00 | 0.0000E+00 | 0.0000E+00 |

Figure 8:
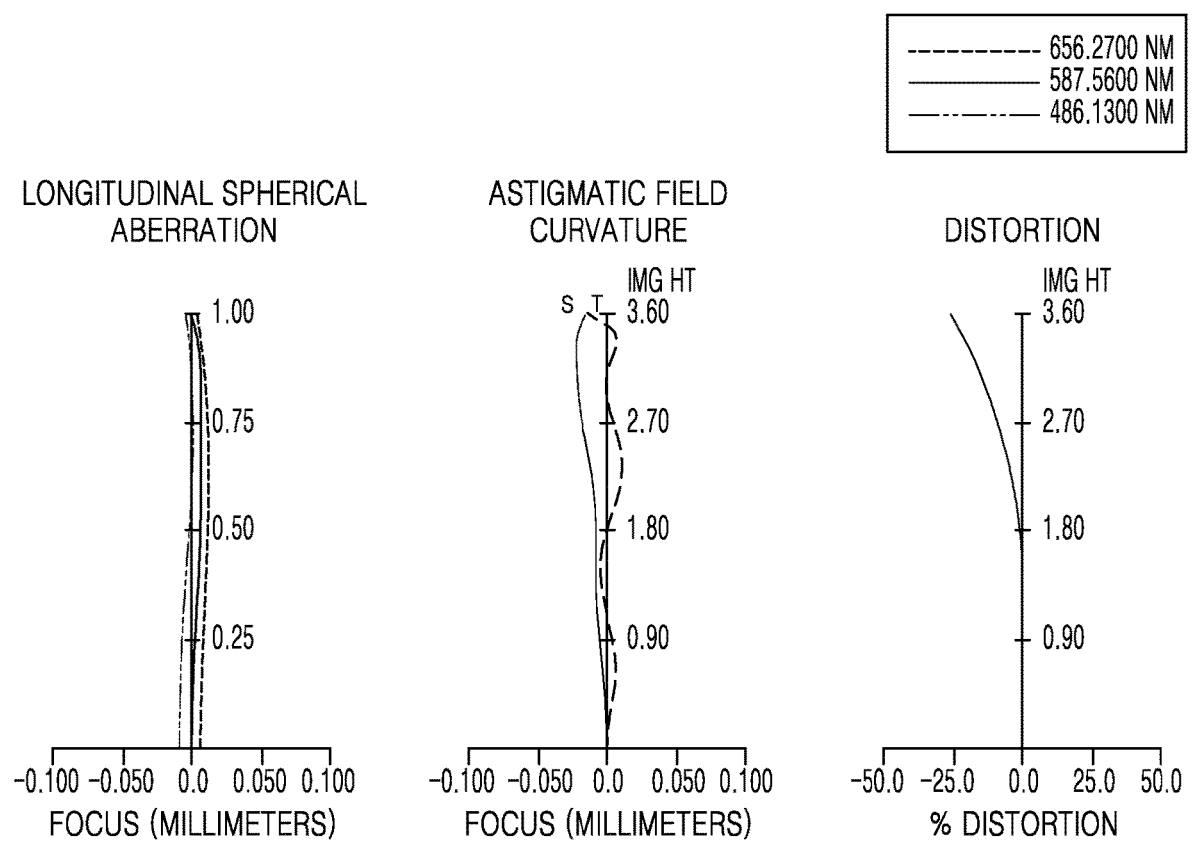
FIG. 8 is an aberration diagram of an optical lens assembly according to the fourth embodiment.

FIG. 8 illustrates longitudinal spherical aberration, astigmatic field curvature, and distortion aberration of the optical lens assembly according to the fourth embodiment.

Fifth Embodiment

FIG. 9 illustrates an optical lens assembly according to a fifth embodiment. Table 9 shows, for example, design data of the fifth embodiment.

f: 2.53 mm Fno: 2.75 2w: 124.65°

TABLE 9

| Lens surface | R | Dn | nd | vd | EFL |
|---|---|---|---|---|---|
| obj | infinity | infinity | | | |
| 1* | 54.015 | 1.476 | 1.5441 | 56.09 | −9.24 |
| 2* | 4.555 | 2.736 | | | |
| 3* | −6.273 | 2.852 | 1.6142 | 25.59 | 14.088 |
| 4* | −4.266 | 0.158 | | | |
| 5* | 3.671 | 1.336 | 1.5441 | 56.09 | 9.835 |
| 6* | 10.188 | 0.34 | | | |
| ST | infinity | 0.028 | | | |
| 8* | 5.437 | 0.952 | 1.5441 | 56.09 | 2.956 |
| 9* | −2.143 | 0.049 | | | |
| 10* | −1.829 | 0.591 | 1.65038 | 21.52 | −3.306 |
| 11* | −13.784 | 0.23 | | | |
| 12* | 4.859 | 1.07 | 1.5311 | 55.9 | 4.786 |
| 13* | −4.922 | 0.172 | | | |
| 14* | 7.296 | 0.941 | 1.5348 | 55.71 | −4.58 |
| 15* | 1.751 | 0.38 | | | |
| 16 | infinity | 0.11 | 1.5168 | 64.2 | infinity |
| 17 | infinity | 0.505 | | | |
| IMGS | infinity | | | | |

Table 10 shows aspherical coefficients in the fifth embodiment.

TABLE 10

| | Lens surface | | | | | |
|---|---|---|---|---|---|---|
| | 1 | 2 | 3 | 4 | 5 | 6 |
| K(Conic) | 1.0000 | −1.9238 | −0.2149 | −4.4268 | −1.1217 | 0.0000 |
| A(4th) | 4.3203E−03 | 9.1734E−03 | 4.5369E−04 | 2.6659E−04 | −6.5306E−03 | −4.3693E−02 |
| B(6th) | −2.9164E−04 | −3.5354E−04 | 2.4874E−05 | −5.9363E−05 | −1.4835E−03 | −1.3763E−03 |
| C(8th) | 1.1208E−05 | −1.4839E−05 | 7.2170E−07 | 3.5119E−06 | −3.7511E−04 | 1.0550E−03 |
| D(10th) | −2.9224E−07 | −1.5910E−06 | 2.0799E−08 | 6.3006E−08 | −4.7896E−05 | 1.3809E−04 |
| E(12th) | 4.7773E−09 | 1.8029E−07 | −2.2134E−09 | 0.0000E+00 | 0.0000E+00 | 0.0000E+00 |

| | Lens surface | | | | | |
|---|---|---|---|---|---|---|
| | 8 | 9 | 10 | 11 | 12 | 13 |
| K(Conic) | 1.6894 | 1.8859 | 0.4072 | 0.0000 | 2.9904 | −34.8764 |
| A(4th) | −2.9104E−02 | −4.8109E−02 | −2.2725E−02 | −4.2906E−02 | −4.6039E−02 | 2.6022E−02 |
| B(6th) | −2.2295E−02 | −1.0648E−01 | −8.0761E−02 | 2.7461E−02 | −8.4463E−03 | −2.0460E−02 |
| C(8th) | 1.1713E−02 | 4.3818E−02 | 5.2006E−02 | −3.0452E−03 | −5.1335E−04 | 3.3367E−03 |
| D(10th) | −4.5492E−02 | 2.6793E−02 | 2.4730E−02 | 1.0184E−03 | 3.9363E−05 | −1.1112E−04 |
| E(12th) | 4.9519E−16 | 4.9519E−16 | 4.9519E−16 | 0.0000E+00 | 0.0000E+00 | 0.0000E+00 |

| | Lens surface | |
|---|---|---|
| | 14 | 15 |
| K(Conic) | 6.8770 | −7.0491 |
| A(4th) | −7.8271E−02 | −2.6155E−02 |
| B(6th) | 9.3639E−03 | 2.8461E−03 |
| C(8th) | 5.9036E−04 | −1.9259E−04 |
| D(10th) | −1.1851E−04 | 4.6563E−06 |
| E(12th) | 0.0000E+00 | 0.0000E+00 |

Figure 10:
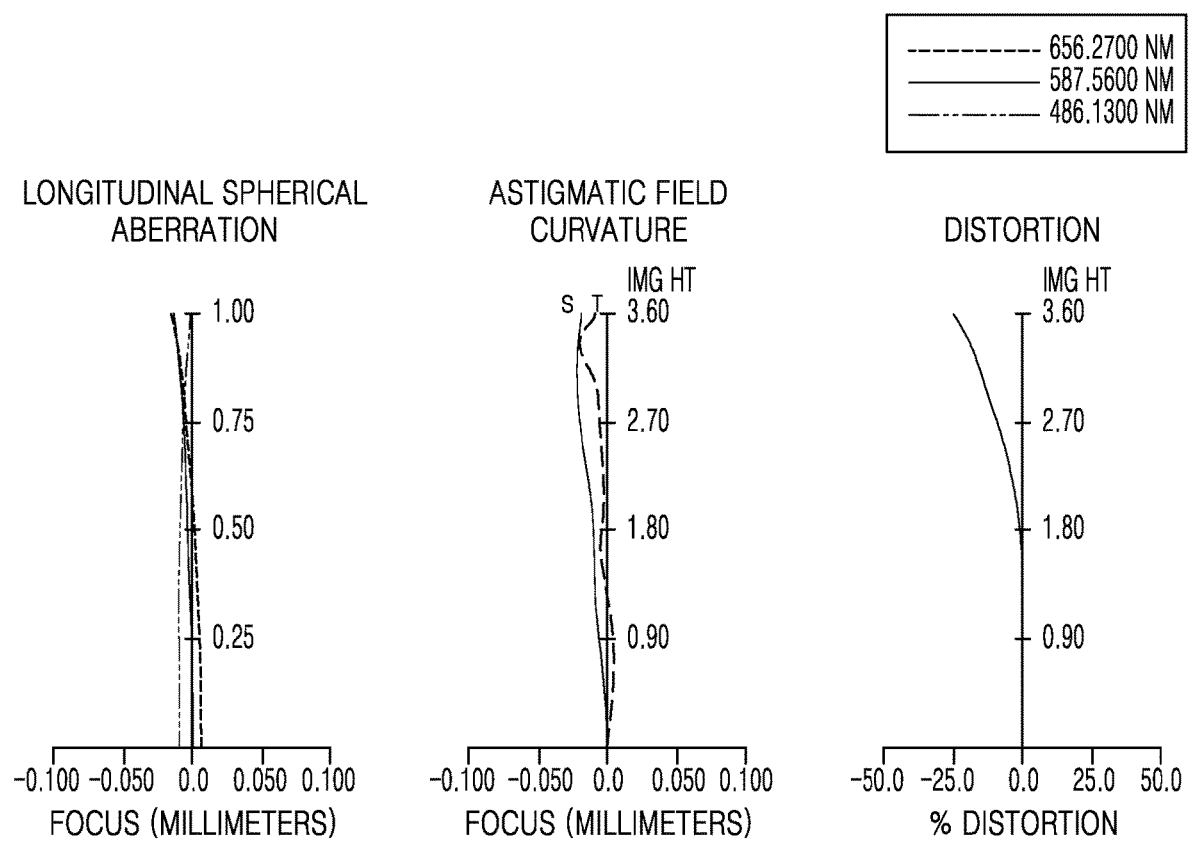
FIG. 10 is an aberration diagram of an optical lens assembly according to the fifth embodiment.

FIG. 10 illustrates longitudinal spherical aberration, astigmatic field curvature, and distortion aberration of the optical lens assembly according to the fifth embodiment.

Sixth Embodiment

FIG. 11 illustrates an optical lens assembly according to a sixth embodiment. Table 11 shows, for example, design data of the sixth embodiment.

f: 3.11 mm Fno: 2.90 2w: 97.87°

TABLE 11

| Lens surface | R | Dn | nd | vd | EFL |
|---|---|---|---|---|---|
| obj | infinity | infinity | | | |
| 1 | 14.809 | 2.391 | 1.8042 | 46.5 | −9.888 |
| 2 | 4.801 | 2.009 | | | |
| 3* | −87.269 | 1.735 | 1.5441 | 56.09 | −8.807 |
| 4* | 5.106 | 1.159 | | | |
| 5 | 6.017 | 2.19 | 1.741 | 52.6 | 5.62 |
| 6 | −11.426 | 1.251 | | | |
| 7* | 3.226 | 1.528 | 1.5441 | 56.09 | 8.882 |
| 8* | 8.088 | 0.13 | | | |
| ST | infinity | 0.107 | | | |
| 10* | 7.733 | 0.728 | 1.5441 | 56.09 | 3.642 |
| 11* | −2.576 | 0.05 | | | |
| 12* | −2.68 | 0.348 | 1.65038 | 21.52 | −3.928 |
| 13* | 57.409 | 0.306 | | | |
| 14* | 10.337 | 1.27 | 1.5348 | 55.71 | 5.441 |
| 15* | −3.876 | 0.064 | | | |
| 16* | 8.472 | 0.696 | 1.5348 | 55.71 | −4.274 |
| 17* | 1.748 | 0.4 | | | |
| 18 | infinity | 0.3 | 1.5168 | 64.2 | infinity |
| 19 | infinity | 0.565 | | | |
| IMG | infinity | | | | |

Table 12 shows aspherical coefficients in the sixth embodiment.

TABLE 12

| | Lens surface | | | | | |
|---|---|---|---|---|---|---|
| | 3 | 4 | 7 | 8 | 10 | 11 |
| K(Conic) | −1.0000 | −0.5384 | 0.0000 | 12.1635 | −24.8165 | 3.1376 |
| A(4th) | 6.2951E−03 | 9.5937E−03 | −3.6287E−03 | −4.9529E−02 | −4.3184E−02 | −9.3208E−03 |
| B(6th) | −3.7676E−04 | −3.8143E−05 | −1.7282E−03 | −9.3333E−03 | −1.8757E−02 | −4.8642E−02 |
| C(8th) | 1.3023E−05 | −8.1462E−05 | −2.4939E−04 | 1.1078E−03 | −4.6832E−03 | 1.8585E−02 |
| D(10th) | −3.3368E−07 | 6.0332E−06 | 0.0000E+00 | 1.4698E−02 | 2.7093E−02 | 1.6812E−02 |
| E(12th) | 5.1578E−09 | −1.4271E−07 | 0.0000E+00 | 0.0000E+00 | 0.0000E+00 | 0.0000E+00 |

| | Lens surface | | | | | |
|---|---|---|---|---|---|---|
| | 12 | 13 | 14 | 15 | 16 | 17 |
| K(Conic) | 0.0000 | 0.0000 | 2.5926 | −50.0000 | 0.0000 | −8.5736 |
| A(4th) | −2.2433E−02 | −2.2531E−02 | −1.7835E−02 | 3.0216E−03 | −6.3360E−02 | −2.9837E−02 |
| B(6th) | −5.2885E−02 | 1.7827E−02 | −9.4924E−03 | −1.1901E−02 | 1.3607E−03 | 3.5235E−03 |
| C(8th) | 4.9619E−02 | −4.8723E−03 | 2.6271E−03 | 2.1532E−03 | 2.1444E−03 | −2.1992E−04 |
| D(10th) | −2.4529E−02 | 0.0000E+00 | 0.0000E+00 | −1.3132E−04 | −2.7966E−04 | 0.0000E+00 |
| E(12th) | 0.0000E+00 | 0.0000E+00 | 0.0000E+00 | 0.0000E+00 | 0.0000E+00 | 0.0000E+00 |

Figure 12:
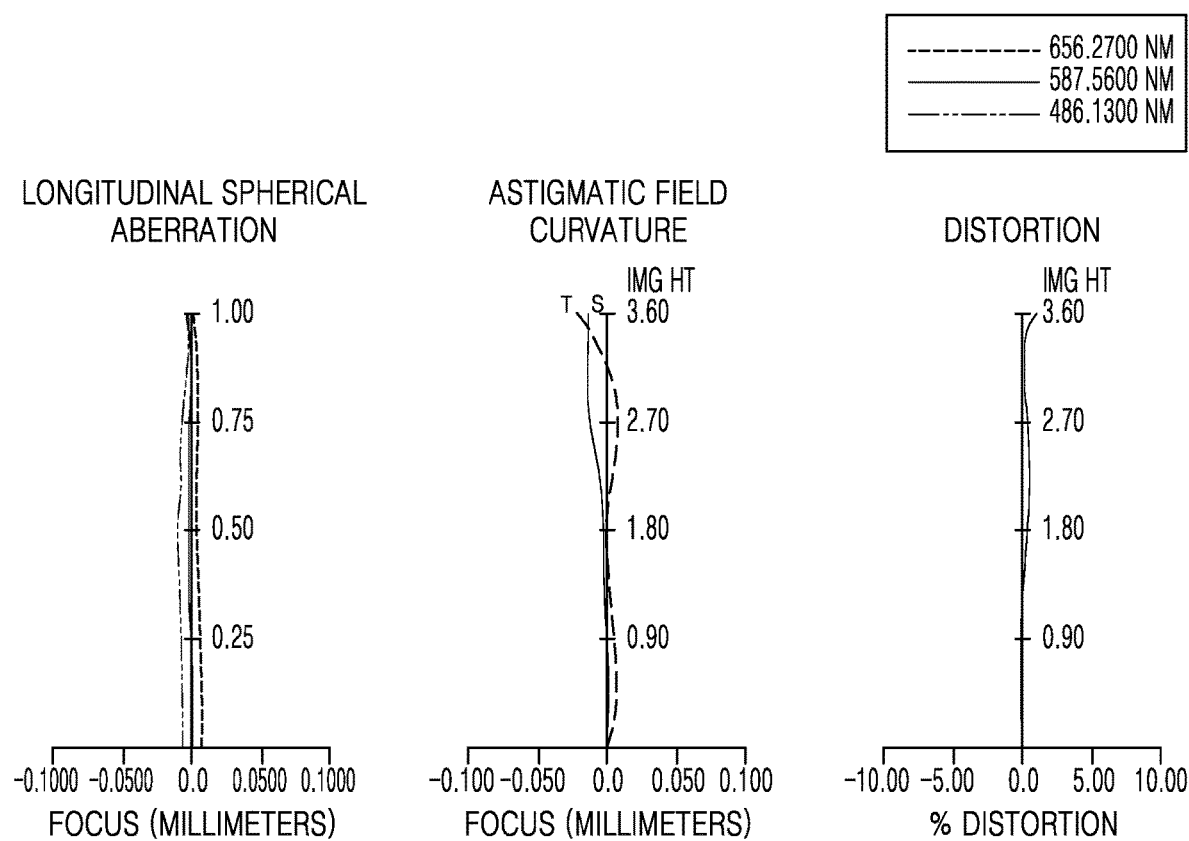
FIG. 12 is an aberration diagram of an optical lens assembly according to the sixth embodiment.

FIG. 12 illustrates longitudinal spherical aberration, astigmatic field curvature, and distortion aberration of the optical lens assembly according to the sixth embodiment.

The following shows the various data of optical lens assemblies that satisfy Conditions (1) to (4).

TABLE 13

|    | Embodiment 1 | Embodiment 2 | Embodiment 3 | Embodiment 4 | Embodiment 5 | Embodiment 6 |
|----|-------|-------|-------|-------|-------|-------|
| f  | 2.19  | 2.19  | 2.18  | 2.10  | 2.53  | 3.11  |
| fa | 2.73  | 2.81  | 2.74  | 3.39  | 5.44  | 4.40  |
| fb | 33.69 | 26.31 | 42.53 | 11.15 | 8.46  | 35.15 |
| f1 | −7.93 | −7.47 | −7.98 | −8.41 | −9.24 | −9.89 |
| f2 | −25.67| −12.68| −12.28| −11.58|       | −8.81 |
| f3 | 22.95 | 12.64 | 10.82 | 9.68  | 14.09 | 5.62  |
| f4 | 4.61  | 4.74  | 5.08  | 5.68  | 9.84  | 8.88  |
| f5 | 3.21  | 3.40  | 3.35  | 3.51  | 2.96  | 3.64  |
| f6 | −2.66 | −2.82 | −2.62 | −2.81 | −3.31 | −3.93 |
| f7 | 3.72  | 3.85  | 4.18  | 3.90  | 4.79  | 5.44  |
| f8 | −4.31 | −4.59 | −5.38 | −5.99 | −4.58 | −4.27 |

TABLE 14

|               |         | Embodiment 1 | Embodiment 2 | Embodiment 3 | Embodiment 4 | Embodiment 5 | Embodiment 6 |
|---------------|---------|--------------|--------------|--------------|--------------|--------------|--------------|
| Condition (1) | fb/fa   | 12.33        | 9.36         | 15.51        | 3.29         | 1.56         | 7.98         |
| Condition (2) | fap/f   | 2.11         | 2.17         | 2.33         | 2.70         | 3.89         | 2.86         |
| Condition (3) | f4/f    | 2.11         | 2.17         | 2.33         | 2.70         | —            | 2.86         |
| Condition (4) | |CRA Max| | 33.31      | 35.04        | 34.98        | 33.78        | 32.65        | 34.15        |

Thus, the optical lens assemblies according to various embodiments disclosed herein may implement wide angles and miniaturization and may reduce the image plane changes due to the temperature changes.

The optical lens assemblies according to various embodiments may be applied, for example, to electronic apparatuses including image sensors. The optical lens assemblies according to various embodiments may be applied to various electronic apparatuses such as digital cameras, interchangeable lens cameras, video cameras, mobile phone cameras, compact mobile device cameras, and drone cameras.

Figure 13:
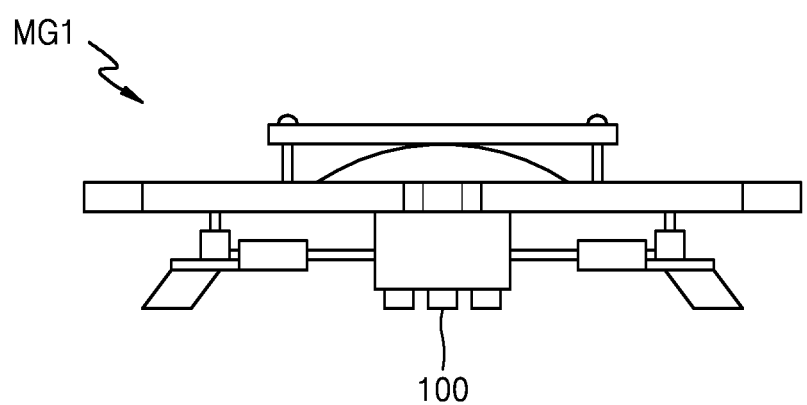
FIG. 13 illustrates an example of an electronic apparatus including an optical lens assembly according to an embodiment.

FIG. 13 illustrates an example in which an optical lens assembly 100 according to an embodiments is installed in a drone MG1. Flight by the drone MG1 may be configured to be controlled by a remote controller, and images may be captured through the optical lens assembly 100 when the drone MG1 is in flight. The embodiments described with reference to FIGS. 1 to 12 may be used for the optical lens assembly 100. Thus, in this application, the optical lens assembly 100 may be manufactured to be compact and lightweight.

Figure 14:
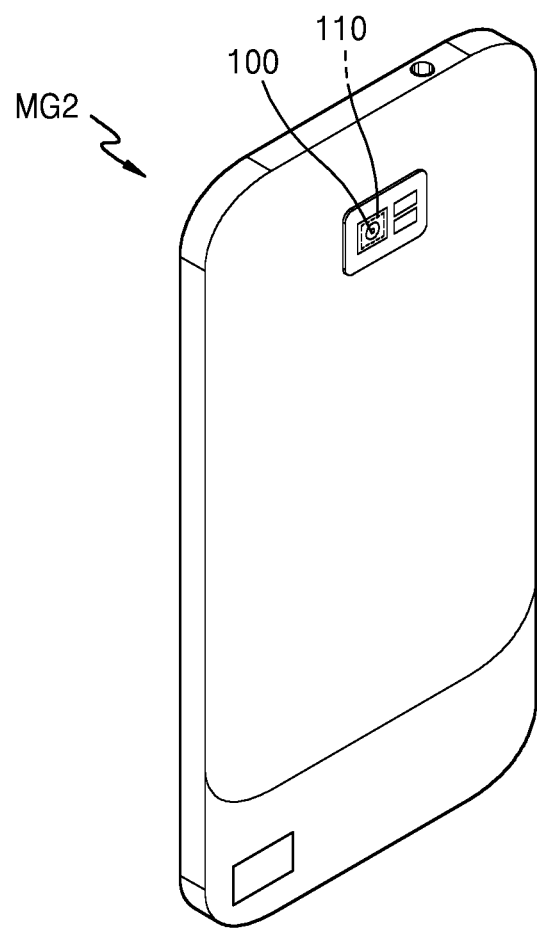
FIG. 14 illustrates another example of an electronic apparatus including an optical lens assembly according to another embodiment.

FIG. 14 illustrates another example of an electronic apparatus MG2 including an optical lens assembly according to another embodiment. Although FIG. 14 illustrates an example in which the electronic apparatus MG2 is installed in a mobile phone, the inventive concept is not limited thereto. The electronic apparatus MG2 may include at least one optical lens assembly 100 and an image sensor 110. The image sensor 110 receives images formed by the at least one optical lens assembly 100 and converts the received images into electrical image signals. The optical lens assemblies described with reference to FIGS. 1 to 12 may be used as the optical lens assembly 100. Thus, a photographing apparatus capable of high-performance photography may be implemented by applying the optical lens assemblies disclosed herein.

The image sensor 110 may include one or more infrared detection pixels. The infrared detection pixels may enable infrared photography when visible light photography is difficult, for example when photography is done indoors or at night. To enable infrared photography, a color filter included in the image sensor may transmit not only lights of wavelengths corresponding to red, green, and blue, but also infrared wavelengths. But when infrared wavelengths are not blocked, it may cause noise in the visible-light image. To address this issue, in some embodiments, an infrared blocking film may be arranged between a first lens group and a second lens group, and the infrared blocking film may be moved by an actuator. Accordingly, when performing infrared photography, the infrared blocking film may be moved so that it does not intersect the optical path. Conversely, when performing visible-light photography, the infrared blocking film may be moved onto the optical path so infrared rays may be blocked by the infrared blocking film. Alternatively, when an infrared blocking film is not used, infrared noise in visible-light photographs may be removed by a processor.

In addition, the optical lens assemblies according to various embodiments may be applied, for example, to virtual reality devices, augmented reality devices, and surround view input devices of vehicles.

An electronic apparatus 201 in a network environment 200 according to an embodiment will be described with reference to FIG. 15. The electronic apparatus 201 may include a bus 210, a processor 220, a camera module 225, a memory 230, an input/output (I/O) interface 250, a display 260, and a communication interface 270. In some embodiments, the electronic apparatus 201 may not include at least one of the above components or may further include other components.

The bus 210 may include, for example, a circuit for connecting the above components (210 to 270) and transmitting communication information (e.g., control messages and/or data) between the above components.

The processor 220 may include at least one of a central processing unit (CPU), an application processor (AP), or a communication processor (CP). For example, the processor 220 may execute control of one or more other components of the electronic apparatus 201 and/or data processing or operations related to communication.

For example, the camera module 225 may be configured to capture a still image and a moving image (video). According to an embodiment, the camera module 225 may include one or more image sensors (e.g., a front sensor or a rear sensor), a lens, an image signal processor (ISP), or a flash (e.g., a light-emitting diode (LED) or a xenon lamp). For example, the optical lens assemblies according to various embodiments may be applied to the camera module 225.

The memory 230 may include a volatile memory and/or a nonvolatile memory. For example, the memory 230 may store data or commands related to one or more other components of the electronic apparatus 201. According to an embodiment, the memory 230 may store software and/or a program 240. The program 240 may include, for example, a kernel 241, middleware 243, an application programming interface (API) 245, and/or an application program (or "application") 247. At least a portion of the kernel 241, the middleware 243, and the API 245 may be referred to as an operating system (OS).

For example, the kernel 241 may control or manage system resources (e.g., the bus 210, the processor 220, or the memory 230) used to execute operations or functions implemented in other programs (e.g., the middleware 243, the API 245, or the application program 247). Also, the kernel 241 may provide an interface for controlling or managing the system resources when the middleware 243, the API 245, or the application program 247 accesses each component of the electronic apparatus 201.

For example, the middleware 243 may perform a relay function so that the API 245 or the application program 247 may communicate data with the kernel 241.

Also, the middleware 243 may process one or more operation requests received from the application program 247 according to the priority thereof. For example, the middleware 243 may give at least one of the application programs 247 the priority to use the system resource (e.g., the bus 210, the processor 220, or the memory 230) of the electronic apparatus 201. For example, the middleware 243 may perform scheduling or load balancing on the one or more operation requests by processing the one or more operation requests according to the priority given to the at least one.

For example, the API 245 may be an interface for the application 247 to control a function provided by the kernel 241 or the middleware 243, and may include at least one interface or function (e.g., instructions) for file control, window control, image processing, or character control.

For example, the I/O interface 250 may function as an interface for transmitting a command or data input from the user or another external device to one or more other components of the electronic apparatus 201. Also, the I/O interface 250 may output a command or data received from one or more other components of the electronic apparatus 201 to the user or another external device.

The display 260 may include, for example, a liquid crystal display (LCD), a light-emitting diode (LED) display, an organic light-emitting diode (OLED) display, a microelectromechanical system (MEMS) display, or an electronic paper display. For example, the display 260 may display various types of content (e.g., texts, images, videos, icons, or symbols) to the user. For example, the display 260 may include a touchscreen and may receive a touch, gesture, proximity, or hovering input by using an electronic pen or a portion of the body of the user.

For example, the communication interface 270 may set the communication between the electronic apparatus 201 and an external device (e.g., a first external electronic apparatus 202, a second external electronic apparatus 204, or a server 206). For example, by wireless communication or wired communication, the communication interface 270 may be connected to a network 262 to communicate with the external device (e.g., the second external electronic apparatus 204 or the server 206).

The wireless communication may use, for example, at least one of Long-Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), and Global System for Mobile communication (GSM) as cellular communication protocol. Also, the wireless communication may include, for example, short-range communication 264. The short-range communication 264 may include, for example, at least one of Wireless Fidelity (WiFi), Bluetooth, Near-Field Communication (NFC), and Global Navigation Satellite System (GNSS). The GNSS may include, for example, at least one of Global Positioning System (GPS), Global Navigation Satellite System (GLONASS), BeiDou Navigation Satellite System (hereinafter referred to as "BeiDou"), and Galileo (or the European global satellite-based navigation system) according to regions or bandwidths. Hereinafter, the term "GPS" may be interchangeably used with the term "GNSS." The wired communication may include, for example, at least one of universal serial bus (USB), high definition multimedia interface (HDMI), recommended standard-232 (RS-232), and plain old telephone service (POTS). The network 262 may include, for example, at least one of a telecommunications network, a computer network (e.g., Local Area Network (LAN) or Wide Area Network (WAN)), the Internet, and a telephone network.

Each of the first and second external electronic apparatuses 202 and 204 may be similar to or different in type from the electronic apparatus 201. According to an embodiment, the server 206 may include a group of one or more servers. According to various embodiments, all or some of the operations executed in the electronic apparatus 201 may be executed in one or more other electronic apparatuses (e.g., the external electronic apparatus 202 or 204 or the server 206). According to an embodiment, when the electronic apparatus 201 needs to perform a function or a service automatically or at the request, the electronic apparatus 201 may request at least some functions related thereto from other devices (e.g., the external electronic apparatus 202 or 204 or the server 206) in addition to or instead of directly executing the function or the service. The other electronic apparatuses (e.g., the external electronic apparatus 202 or 204 or the server 206) may execute the requested function or the additional function and transmit the execution results to the electronic apparatus 201. The electronic apparatus 201 may provide the requested function or service by processing the received execution results additionally or without change. For this purpose, for example, cloud computing, distributed computing, or client-server computing technology may be used.

Figure 15:
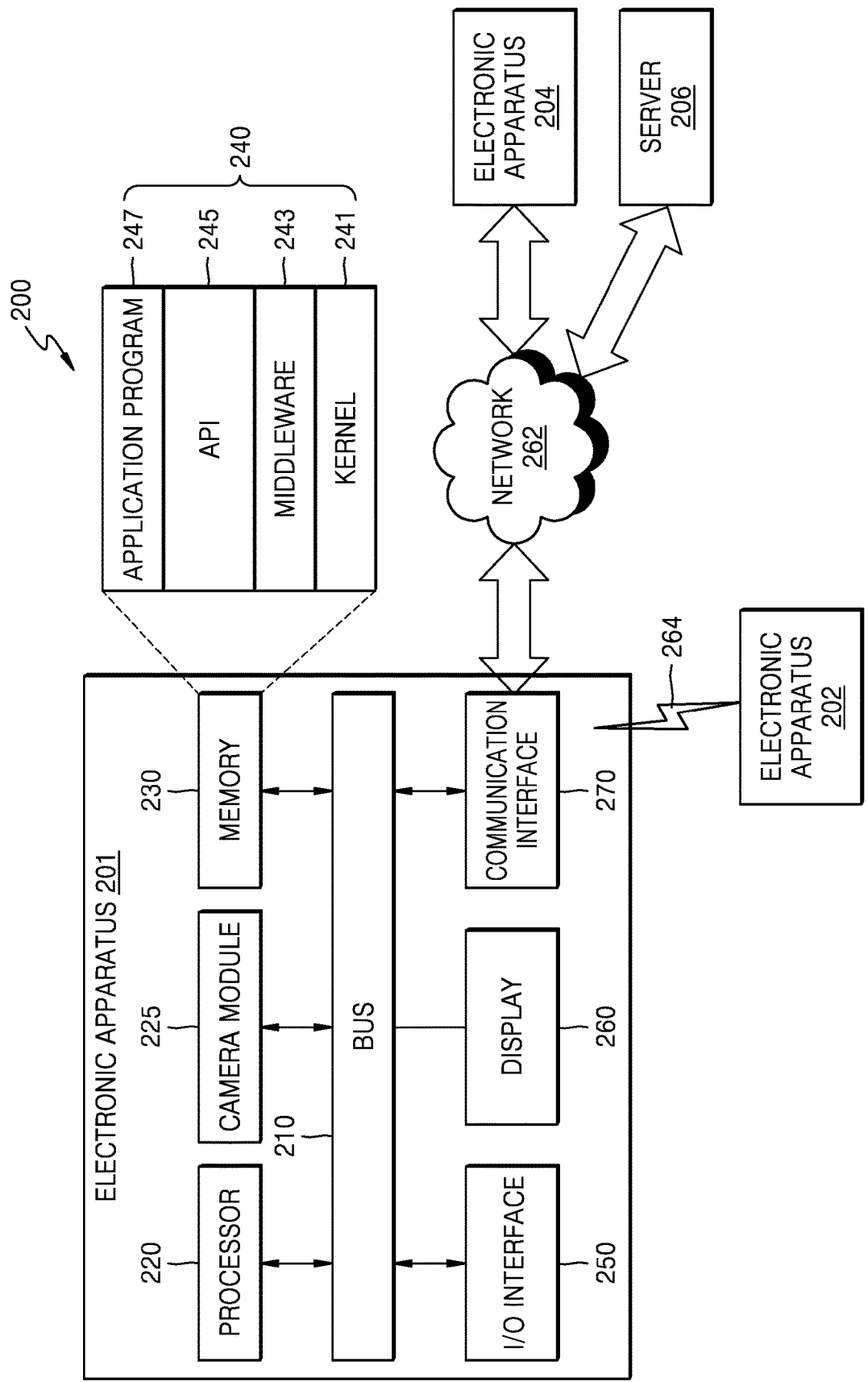
FIG. 15 illustrates an electronic apparatus in a network environment according to an embodiment.
Figure 16:
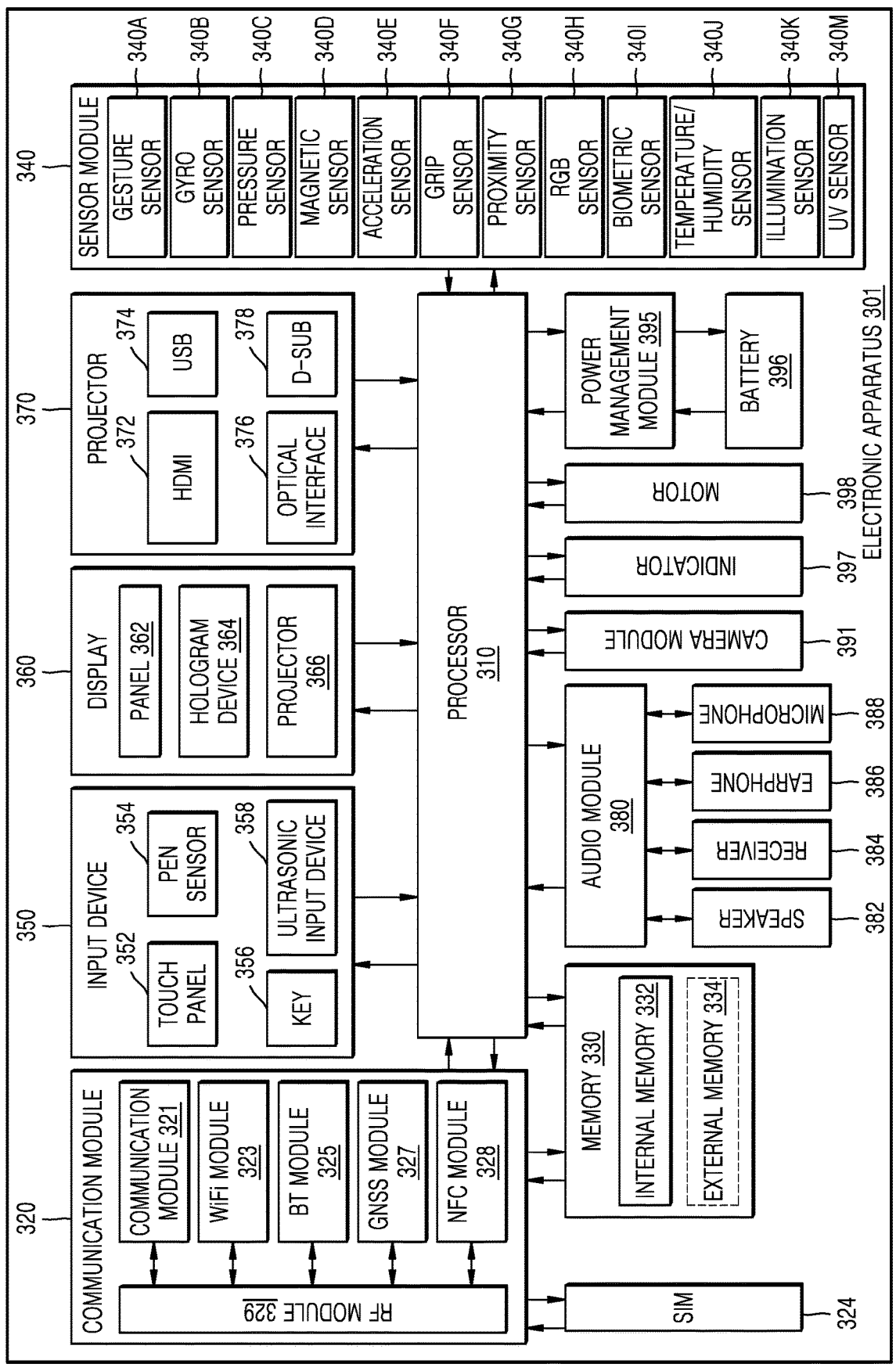
FIG. 16 is a block diagram of an electronic apparatus according to an embodiment.

FIG. 16 is a block diagram of an electronic apparatus 301 according to an embodiment. The electronic apparatus 301 may include, for example, all or some of the electronic apparatus 201 illustrated in FIG. 15. The electronic apparatus 301 may include at least one processor (e.g., application processor (AP)) 310, a communication module 320, a subscriber identification module (SIM) 324, a memory 330, a sensor module 340, an input device 350, a display 360, an interface 370, an audio module 380, a camera module 391, a power management module 395, a battery 396, an indicator 397, and a motor 398.

For example, by driving an operating system (OS) or an application program, the processor 310 may control a plurality of hardware or software components connected to the processor 310 and perform various data processings and operations. The processor 310 may be implemented, for example, as a system on chip (SoC). According to an embodiment, the processor 310 may further include a graphic processing unit (GPU) and/or an image signal processor. The processor 310 may include at least some (e.g., cellular module 321) of the components illustrated in FIG. 16. The processor 310 may load a command or data received from at least one of other components (e.g., a nonvolatile memory) into a volatile memory, process the same, and store various data in the nonvolatile memory.

The communication module 320 may have an identical or similar configuration to the communication interface 270 of FIG. 15. The communication module 320 may include, for example, the cellular module 321, a WiFi module 323, a Bluetooth (BT) module 325, a GNSS module 327 (e.g., a GPS module, a Glonass module, a Beidou module, or a Galileo module), an NFC module 328, and a radio frequency (RF) module 329.

The cellular module 321 may provide, for example, a voice call service, a video call service, a text message service, or an Internet service through a communication network. According to an embodiment, the cellular module 321 may identify and authenticate the electronic apparatus 301 in the communication network by using the subscriber identification module (e.g., SIM card) 324. According to an embodiment, the cellular module 321 may perform at least some of the functions that may be provided by the processor 310. According to an embodiment, the cellular module 321 may include a communication processor (CP).

Each of the WiFi module 323, the BT module 325, the GNSS module 327, and the NFC module 328 may include, for example, a processor for processing data transmitted/received through the corresponding module. According to some embodiments, at least some (e.g., two or more) of the cellular module 321, the WiFi module 323, the BT module 325, the GNSS module 327, and the NFC module 328 may be included in an integrated chip (IC) or an IC package.

The RF module 329 may transmit/receive, for example, a communication signal (e.g., an RF signal). The RF module 329 may include, for example, a transceiver, a power amplifier module (PAM), a frequency filter, a low-noise amplifier (LNA), or an antenna. According to other embodiments, at least one of the cellular module 321, the WiFi module 323, the BT module 325, the GNSS module 327, and the NFC module 328 may transmit/receive an RF signal through a separate RF module.

For example, the subscriber identification module 324 may include an embedded SIM and/or a card including an SIM, and may include unique identification information (e.g., integrated circuit card identifier (ICCID)) or subscriber information (e.g., international mobile subscriber identity (IMSI)).

The memory 330 may include, for example, an internal memory 332 or an external memory 334. The internal memory 332 may include, for example, at least one of volatile memories (e.g., dynamic random-access memories (DRAMs), static RAMs (SRAMs), or synchronous DRAMs (SDRAMs)) and nonvolatile memories (e.g., one-time programmable read-only memories (OTPROMs), programmable ROMs (PROMs), erasable and programmable ROMs (EPROMs), electrically erasable and programmable ROMs (EEPROMs), mask ROMs, flash ROMs, flash memories (e.g., NAND flash memories or NOR flash memories), hard disk drives (HDDs), or solid state drives (SSDs)).

The external memory 334 may include, for example, a flash drive such as compact flash (CF), secure digital (SD), micro secure digital (micro-SD), mini secure digital (mini-SD), extreme digital (xD), multimedia card (MMC), or memory stick. The external memory 334 may be operatively and/or physically connected to the electronic apparatus 301 through various interfaces.

For example, the sensor module 340 may measure a physical quantity or detect an operation state of the electronic apparatus 301 and convert the measured or detected information into an electrical signal. The sensor module 340 may include, for example, at least one of a gesture sensor 340A, a gyro sensor 340B, a pressure sensor 340C, a magnetic sensor 340D, an acceleration sensor 340E, a grip sensor 340F, a proximity sensor 340G, a color sensor 340H (e.g., an red/green/blue (RGB) sensor), a biometric sensor 340I, a temperature/humidity sensor 340J, an illumination sensor 340K, and an ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit configured to control at least one sensor included therein. In some embodiments, the electronic apparatus 301 may further include a processor, which is configured separately or as a portion of the processor 310 to control the sensor module 340, to control the sensor module 340 while the processor 310 is in a sleep state.

The input device 350 may include, for example, a touch panel 352, a (digital) pen sensor 354, a key 356, or an ultrasonic input device 358. The touch panel 352 may include, for example, at least one of a capacitive touch panel, a resistive touch panel, an infrared touch panel, and an ultrasonic touch panel. Also, the touch panel 352 may further include a control circuit. The touch panel 352 may further include a tactile layer configured to provide a tactile response to the user.

For example, the (digital) pen sensor 354 may be a portion of the touch panel 352 or may include a separate recognition sheet. The key 356 may include, for example, a physical button, an optical key, or a keypad. The ultrasonic input device 358 may sense an ultrasonic wave generated by an input tool through a microphone (e.g., a microphone 388) and detect data corresponding to the sensed ultrasonic wave.

The display 360 (e.g., the display 360) may include a panel 362, a hologram device 364, or a projector 366. The panel 362 may include an identical or similar configuration to the display 260 of FIG. 15. For example, the panel 362 may be implemented to be flexible, transparent, or wearable. The panel 362 and the touch panel 352 may be configured as one module. According to an embodiment, the panel 362 may include a pressure sensor (or a force sensor) that may measure a pressure strength of a user touch. The pressure sensor may be implemented integrally with the touch panel 352, or may be implemented as one or more sensors separately from the touch panel 352. The hologram device 364 may display a stereoscopic image in the air by using light interference. The projector 366 may display an image by projecting light onto a screen. For example, the screen may be located inside or outside the electronic apparatus 301. According to an embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-subminiature (D-SUB) 378. For example, the interface 370 may be included in the communication interface 270 illustrated in FIG. 15. Additionally or alternatively, the interface 370 may include, for example, a mobile high-definition link (MHL) interface, a secure digital (SD) card/multimedia card (MMC) interface, or an infrared data association (IrDA) standard interface.

For example, the audio module 380 may perform bidirectional conversion between a sound and an electrical signal. For example, at least some components of the audio module 380 may be included in the I/O interface 250 illustrated in FIG. 15. For example, the audio module 380 may process sound information that is input or output through a speaker 382, a receiver 384, an earphone 386, or the microphone 388.

For example, the camera module 391 may be configured to capture a still image and a moving image (video). According to an embodiment, the camera module 391 may include one or more image sensors (e.g., a front sensor or a rear sensor), a lens, an image signal processor (ISP), or a flash (e.g., a light-emitting diode (LED) or a xenon lamp). For example, the optical lens assemblies according to various embodiments may be applied to the camera module 391.

For example, the power management module 395 may manage the power of the electronic apparatus 301. The electronic apparatus 301 may be, but is not limited to, an electronic apparatus that is powered by a battery. According to an embodiment, the power management module 395 may include a power management integrated circuit (PMIC), a charger integrated circuit (IC), or a battery or fuel gauge. The PMIC may have a wired and/or wireless charge mode. For example, the wireless charge mode may include a magnetic resonance mode, a magnetic induction mode, or an electromagnetic wave mode and may further include an additional wireless charge circuit such as a coil loop, a resonant circuit, or a rectifier. For example, the battery gauge may be configured to measure a residual capacity, a charged voltage, a current, or a temperature of the battery 396. The battery 396 may include, for example, a rechargeable battery and/or a solar battery.

The indicator 397 may indicate a particular state of the electronic apparatus 301 or a portion thereof (e.g., the processor 310), such as a booting state, a message state, or a charge state. For example, the motor 398 may be configured to convert an electrical signal into a mechanical vibration and generate a vibration or a haptic effect. Although not illustrated, the electronic apparatus 301 may include a processing device (e.g., a GPU) for supporting a mobile TV. For example, the processing device for supporting a mobile TV may process media data according to the standards such as digital multimedia broadcasting (DMB), digital video broadcasting (DVB), or MediaFLO™.

An optical lens assembly according to an embodiment may include a first lens group having positive refractive power, an iris diaphragm, and a second lens group having positive refractive power, where the first lens group, the iris diaphragm, and the second lens group are arranged from an object side to an image side, the first lens group includes at least one negative lens and two positive lenses, and the optical lens assembly satisfies the following condition:

$$1.5 < \frac{fb}{fa} < 25$$

where "fa" denotes a focal length of the first lens group and "fb" denotes a focal length of the second lens group.

For example, the first lens group may include a first negative lens, a second negative lens having an object-side surface that is concave toward the object side in a paraxial region, a third positive lens, and a fourth positive lens.

For example, the first negative lens and the third positive lens may include a glass spherical lens.

For example, the fourth positive lens may include a glass aspherical lens.

For example, the second lens group may include a fifth positive lens, a sixth negative lens, a seventh positive lens, and an eighth lens having an image-side surface that is concave toward the image side in a paraxial region.

For example, the optical lens assembly may satisfy the following condition:

$$1.5 < \frac{fap}{f} < 4.5$$

where "f" denotes a focal length of the optical lens assembly and "fap" denotes a focal length of a closest image-side lens located closest to the image side in the first lens group.

For example, the first lens group may include at least one glass aspherical lens.

For example, the optical lens assembly may satisfy the following condition:

$$25 < |CRA_{Max}| < 40$$

where "$CRA_{Max}$" denotes an angle between a normal line of an image sensor and a chief ray that is incident at a maximum image height of the image sensor.

An optical lens assembly according to various embodiments may include: a first lens having negative refractive power; a second lens having negative refractive power; a third lens having positive refractive power; a fourth lens having a convex object-side surface and positive refractive power; a fifth lens having positive refractive power; a sixth lens having a concave object-side surface and negative refractive power; a seventh lens having positive refractive power; and an eighth lens having an image-side surface that is concave toward an image side in a paraxial region, wherein the first to eighth lenses are sequentially arranged from an object side to the image side.

An electronic apparatus according to various embodiments may include: an optical lens assembly; and an image sensor configured to receive light formed by the optical lens assembly, where the optical lens assembly includes a first lens group having positive refractive power, an iris diaphragm, and a second lens group having positive refractive power, the first lens group, the iris diaphragm, and the second lens group are arranged from an object side to an image side, the first lens group includes at least one negative lens and two positive lenses, and the optical lens assembly satisfies the following condition:

$$1.5 < \frac{fb}{fa} < 25$$

where "fa" denotes a focal length of the first lens group and "fb" denotes a focal length of the second lens group.

Each of the elements described herein may be configured by one or more components, and the names of the elements may vary according to the type of the electronic apparatus. According to various embodiments, the electronic apparatus may be configured to include at least one of the elements described herein, and some elements may be omitted or additional elements may be further included. Also, according to various embodiments, some of the elements of the electronic apparatus may be combined into one entity to perform the same functions as the previous elements prior to the combination thereof.

The term "module" used herein may refer to, for example, a unit including hardware, software, firmware, or any combination thereof. For example, the term "module" may be interchangeably used with terms such as "unit," "logic," "logical block," "component," or "circuit." A "module" may be a portion or a unit of an integrated component. The "module" may be a portion or a unit of a component for performing one or more functions. A "module" may be implemented mechanically or electronically, depending on the context. For example, a "module" may include at least one of an application-specific integrated circuit (ASIC) chip, a field-programmable gate array (FPGA), or a programmable-logic device for performing some operations, which are known or to be developed.

For example, at least a portion of the apparatus (e.g., modules or functions thereof) or method (e.g., operations) according to various embodiments may be implemented in the form of a program module, i.e. instructions stored in computer-readable storage media. When the instructions are executed by the processor (e.g., the processor 220 of FIG. 15), the one or more processors may perform a function corresponding to the instructions. The computer-readable storage media may include, for example, the memory 230.

The computer-readable storage media may include, for example, hard disks, floppy disks, magnetic media (e.g., magnetic tapes), optical media (e.g., compact disk read-only memory (CD-ROM), digital versatile disk (DVD), or magneto-optical media (e.g., floptical disks)), or hardware devices (e.g., read-only memory (ROM), random-access memory (RAM), or flash memories). Also, the program commands may include machine language codes that may be generated by a compiler, and high-level language codes that may be executed by a computer by using an interpreter. The hardware device may be configured to operate as one or more software modules in order to perform the operation of various embodiments, and vice versa. The program module or the module according to various embodiments may include at least one of the above elements, some of the above elements may be omitted, or additional other elements may be further included therein. The operations performed by the module, the program module, or other elements according to various embodiments may be executed in a sequential, parallel, repeated, or heuristic manner. Also, some operations may be executed in different order or omitted, or other operations may be additionally executed. The embodiments described herein should be considered in a descriptive sense only and not for purposes of limitation. Therefore, the scope of the present disclosure should be interpreted as including all modifications or various other embodiments based on the technical concept of the present disclosure. The above embodiments are merely examples, and those of ordinary skill in the art may derive various modifications and other equivalent embodiments therefrom. Thus, the spirit and scope of the inventive concept should be defined by the following claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optical lens assembly comprising:
a first lens group having positive refractive power,
an iris diaphragm, and
a second lens group having positive refractive power, wherein the first lens group, the iris diaphragm, and the second lens group are arranged from an object side to an image side, and
wherein:
the first lens group comprises at least one negative lens and two positive lenses, and
the optical lens assembly satisfies the following condition:

$$1.5 < \frac{fb}{fa} < 25$$

where "fa" denotes a focal length of the first lens group and "fb" denotes a focal length of the second lens group.

2. The optical lens assembly of claim 1, wherein the first lens group comprises a first negative lens, a second negative lens having an object-side surface that is concave toward the object side in a paraxial region, a third positive lens, and a fourth positive lens.

3. The optical lens assembly of claim 2, wherein the first negative lens and the third positive lens each comprise a glass spherical lens.

4. The optical lens assembly of claim 2, wherein the fourth positive lens comprises a glass aspherical lens.

5. The optical lens assembly of claim 1, wherein the second lens group comprises a fifth positive lens, a sixth negative lens, a seventh positive lens, and an eighth lens having an image-side surface that is concave toward the image side in a paraxial region.

6. The optical lens assembly of claim 1, wherein the optical lens assembly satisfies the following condition:

$$1.5 < \frac{fap}{f} < 4.5$$

where "f" denotes a focal length of the optical lens assembly and "fap" denotes a focal length of a closest image-side lens located closest to the image side in the first lens group.

7. The optical lens assembly of claim 1, wherein the first lens group comprises at least one glass aspherical lens.

8. The optical lens assembly of claim 1, wherein the optical lens assembly satisfies the following condition:

$$25 < |CRA_{Max}| < 40$$

where "$CRA_{Max}$" denotes an angle between a normal line of an image sensor and a chief ray that is incident at a maximum image height of the image sensor.

9. An electronic apparatus comprising:
an optical lens assembly; and
an image sensor configured to receive light formed by the optical lens assembly,
wherein:
the optical lens assembly comprises a first lens group having positive refractive power, an iris diaphragm, and a second lens group having positive refractive power, wherein the first lens group, the iris diaphragm, and the second lens group are arranged from an object side to an image side, the first lens group comprises at least one negative lens and two positive lenses, and the optical lens assembly satisfies the following condition:

$$1.5 < \frac{fb}{fa} < 25$$

where "fa" denotes a focal length of the first lens group and "fb" denotes a focal length of the second lens group.

10. The electronic apparatus of claim 9, wherein the first lens group comprises a first negative lens, a second negative lens having an object-side surface that is concave toward the object side in a paraxial region, a third positive lens, and a fourth positive lens.

11. The electronic apparatus of claim 9, wherein the second lens group comprises a fifth positive lens, a sixth negative lens, a seventh positive lens, and an eighth lens having an image-side surface that is concave toward the image side in a paraxial region.

12. The electronic apparatus of claim 9, wherein the optical lens assembly satisfies the following condition:

$$1.5 < \frac{f4}{f} < 4.5$$

where "f" denotes a focal length of the optical lens assembly and "fap" denotes a focal length of a closest image-side lens located closest to the image side in the first lens group.

13. The electronic apparatus of claim 9, wherein the optical lens assembly satisfies the following condition:

$$25 < |CRA_{Max}| < 40$$

where "$CRA_{Max}$" denotes an angle between a normal line of an image sensor and a chief ray that is incident at a maximum image height of the image sensor.

* * * * *